(12) United States Patent
Lee et al.

(10) Patent No.: US 12,176,985 B2
(45) Date of Patent: Dec. 24, 2024

(54) METHOD AND DEVICE FOR ADAPTING LEARNING CLASS-BASED SYSTEM TO AI MIMO

(71) Applicant: LG Electronics Inc., Seoul (KR)

(72) Inventors: Hojae Lee, Seoul (KR); Sangrim Lee, Seoul (KR); Kyungho Lee, Seoul (KR); Yeongjun Kim, Seoul (KR); Kijun Jeon, Seoul (KR); Sungjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 18/265,109

(22) PCT Filed: Dec. 4, 2020

(86) PCT No.: PCT/KR2020/017660
§ 371 (c)(1),
(2) Date: Jun. 2, 2023

(87) PCT Pub. No.: WO2022/119021
PCT Pub. Date: Jun. 9, 2022

(65) Prior Publication Data
US 2024/0106507 A1 Mar. 28, 2024

(51) Int. Cl.
*H04B 7/06* (2006.01)
*H04B 17/391* (2015.01)

(52) U.S. Cl.
CPC ......... *H04B 7/0626* (2013.01); *H04B 7/0632* (2013.01); *H04B 7/0639* (2013.01); *H04B 17/3913* (2015.01)

(58) Field of Classification Search
CPC .. H04B 7/0626; H04B 7/0632; H04B 7/0639; H04B 17/3913; H04B 7/063; H04B 7/0413; G06N 3/044; G06N 3/0455; G06N 3/047; G06N 3/084; G06N 3/0464; G06N 3/08; H04L 25/0254; H04W 74/0833; H04W 74/006
See application file for complete search history.

(56) References Cited

U.S. PATENT DOCUMENTS 11,132,602 B1* 9/2021 Xie ..................... G06F 9/44552
2022/0039072 A1* 2/2022 Babaei .............. H04W 72/0446

* cited by examiner

*Primary Examiner* — Vineeta S Panwalkar
(74) *Attorney, Agent, or Firm* — Fish & Richardson P.C.

(57) ABSTRACT

The present specification provides a method fir transmitting learning class information, the method being performed by a terminal in a wireless communication system and comprising the steps of: transmitting a random access (RA) preamble to a base station; receiving a random access response (RAR) from the base station in response to the RA preamble; performing a radio resource control (RRC) connection procedure with the base station; determining the learning class information, wherein the learning class information is information about the degree of performance improvement in online learning, and the online learning is artificial intelligence (AI) algorithm-based learning following the activation of the wireless communication system; transmitting the learning class information to the base station; and performing channel state information (CSI) feedback according to the learning class information.

13 Claims, 42 Drawing Sheets

METHOD AND DEVICE FOR ADAPTING LEARNING CLASS-BASED SYSTEM TO AI MIMO

CROSS-REFERENCE TO RELATED APPLICATIONS

This application is a National Stage application under 35 U.S.C. § 371 of International Application No. PCT/KR2020/017660, filed on Dec. 4, 2020. The disclosure of the prior application is incorporated by reference in its entirety.

TECHNICAL FIELD

The present disclosure relates to application of deep learning-based AI algorithms.

BACKGROUND

The application of deep learning-based AI algorithms in the communication environment may be divided into offline learning and online learning. In the communication environment, offline learning may assume that learning is completed before the communication system is activated, and the deep learning AI algorithm is operated in the communication environment based on the learned results. On the other hand, online learning may assume that learning is done even after the communication system is activated, and the deep learning AI algorithm is operated by adaptively reflecting the updated learning results to the activated communication system.

Meanwhile, in the present disclosure, considering the change in performance of the communication system due to online learning, the configuration of the rule for changing the operation of the transceiver will be intensively described.

SUMMARY

According to an embodiment of the present disclosure, there is provided a method and apparatus for determining learning class information, wherein the learning class information is information about the degree of performance improvement in online learning, wherein the online learning is artificial intelligence (AI) algorithm-based learning after a wireless communication system is activated, transmitting the learning class information to a base station and performing channel state information (CSI) feedback according to the learning class information.

According to the present disclosure, if online learning operation of an AI MIMO detector (or auto-encoder) in 6G is allowed, a standard operation definition that can support performance improvement by learning can be provided. In addition, a specification definition in a form that can allow specification changes due to performance changes by online learning and a method for indicating specification changes can be provided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
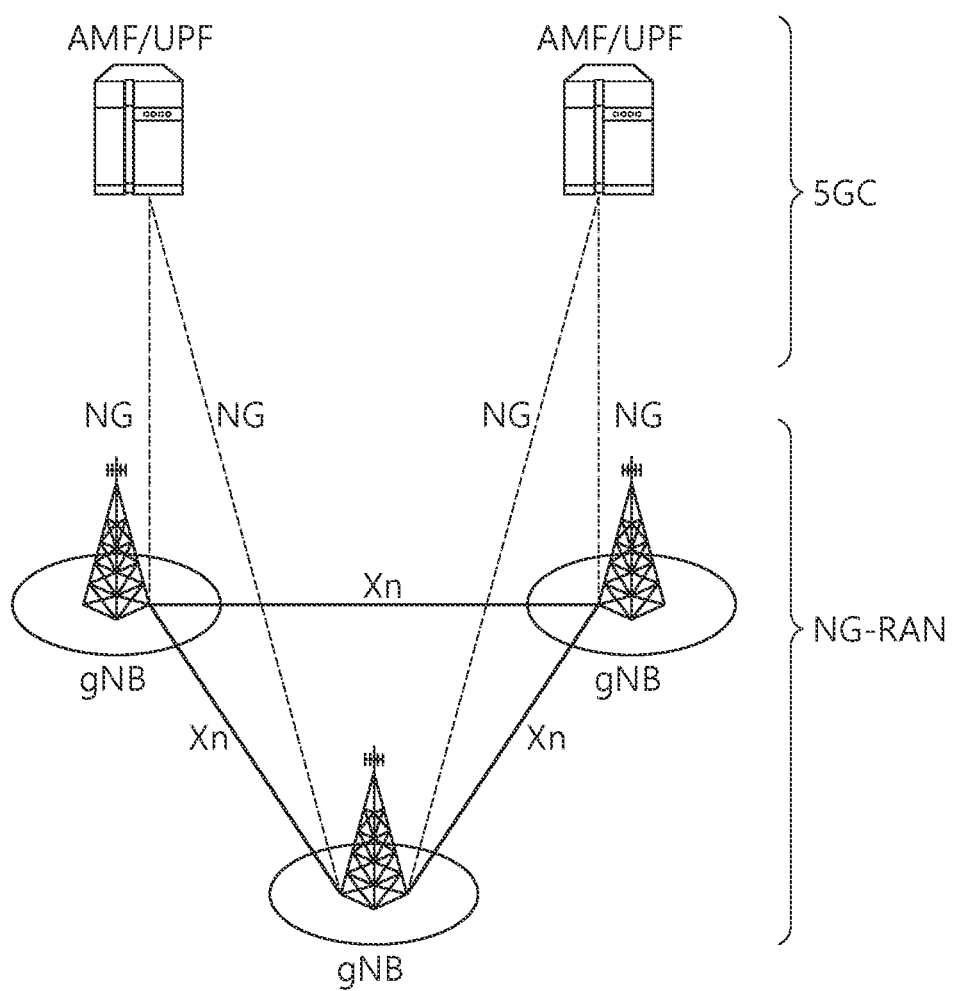
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation—Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
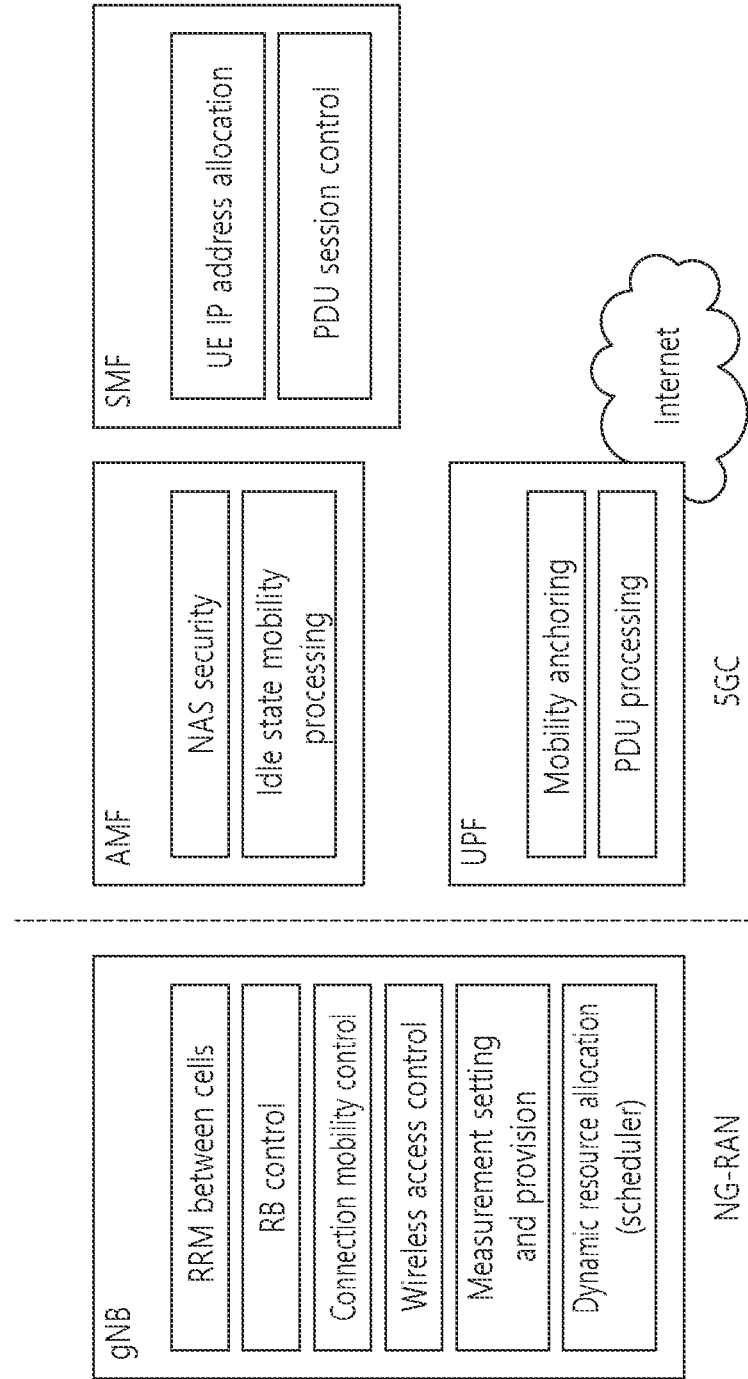
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non-Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
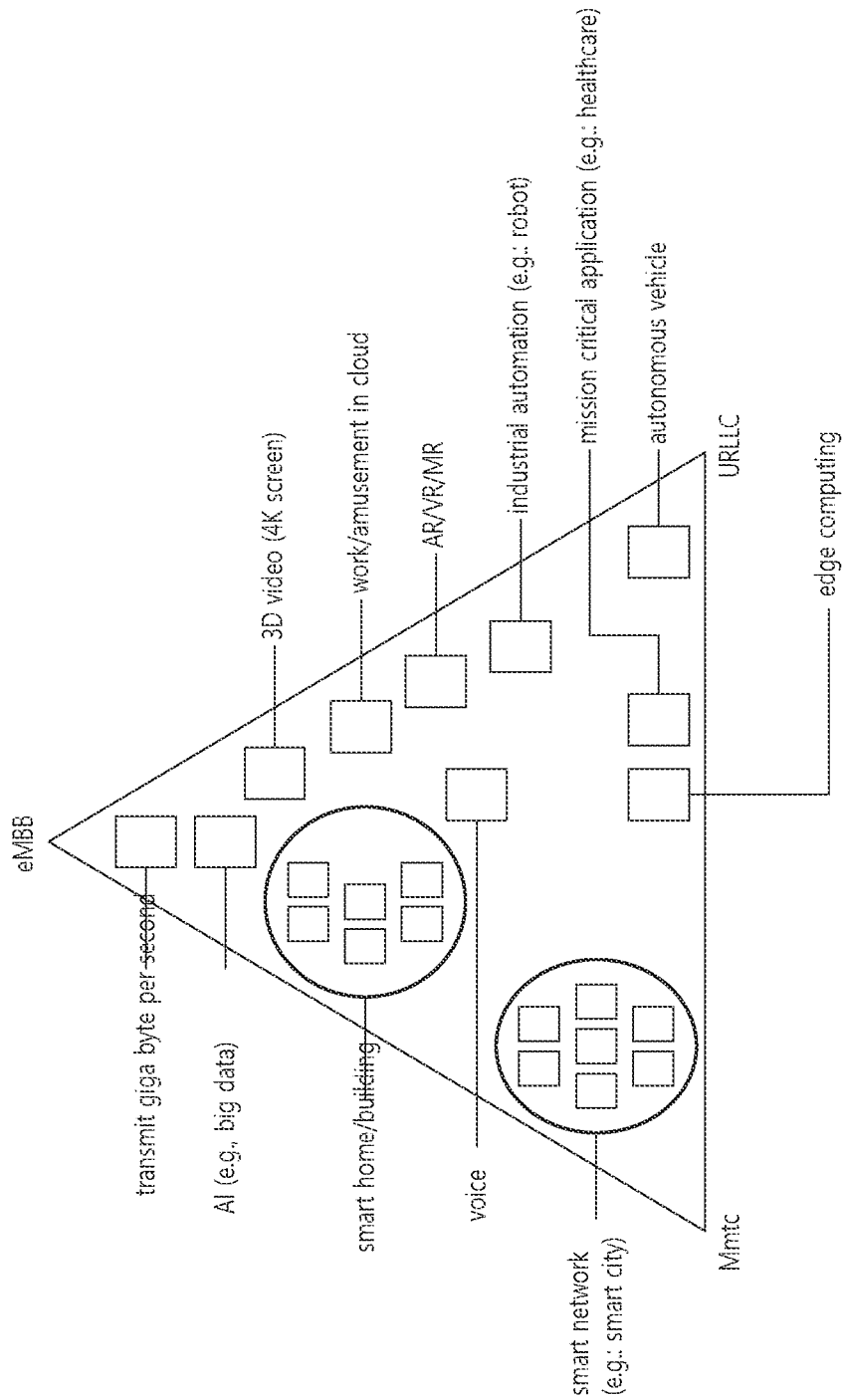
FIG. 3 illustrates examples of 5G usage scenarios to which the technical features of the present disclosure can be applied.

FIG. 3 illustrates examples of 5G usage scenarios to which the technical features of the present disclosure can be applied. The 5G usage scenarios shown in FIG. 3 are only exemplary, and the technical features of the present disclosure can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km 2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present disclosure will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

Figure 4:
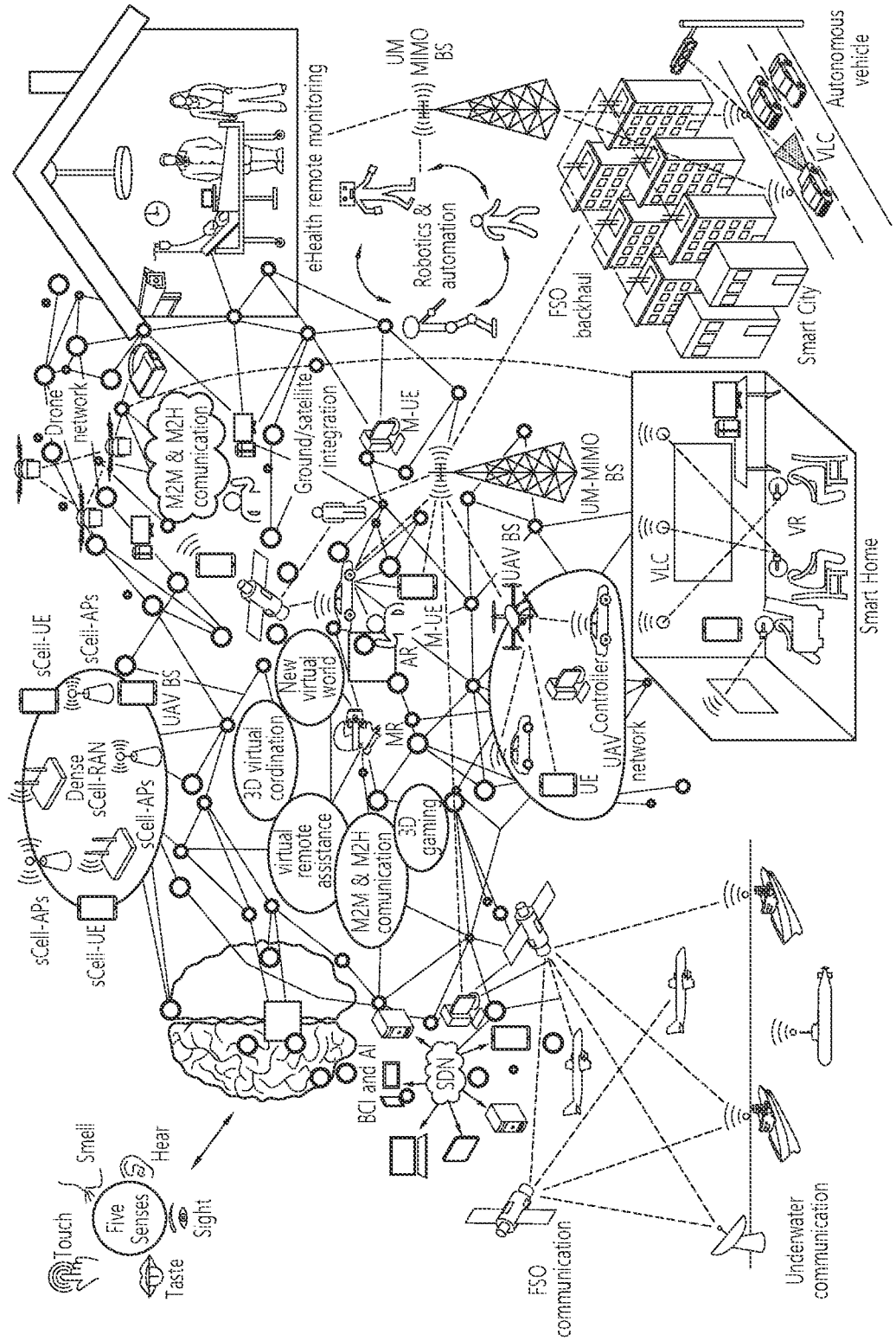
FIG. 4 is a diagram illustrating an example of a communication structure that can be provided in a 6G system.

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security. FIG. 4 is a diagram illustrating an example of a communication structure that can be provided in a 6G system. The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-digestion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>

Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
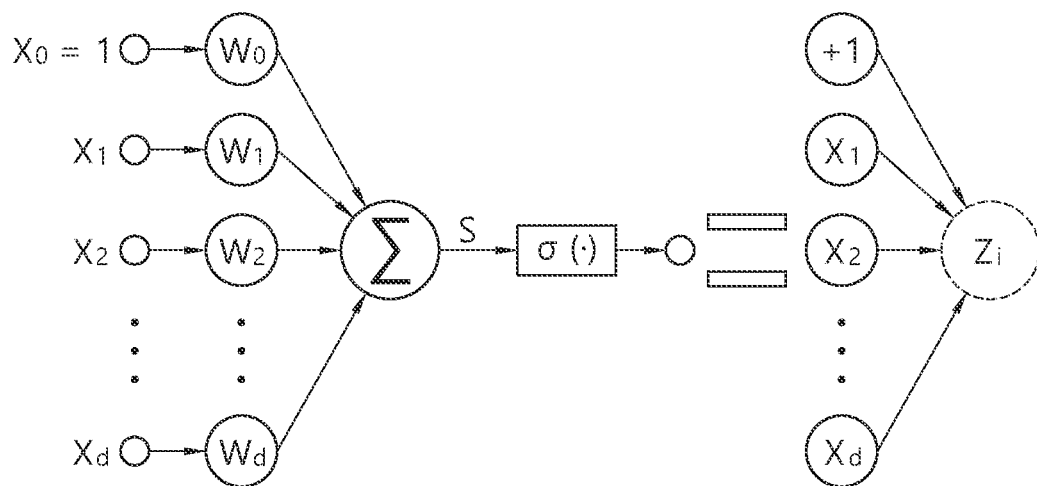
FIG. 5 schematically illustrates an example of a perceptron structure.

FIG. 5 schematically illustrates an example of a perceptron structure.

Referring to FIG. 5, if the input vector x=(x1, x2 . . . , xd) is input, each component is multiplied by the weight (W1, W2 . . . , Wd), after summing up all the results, applying the activation function 60, the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
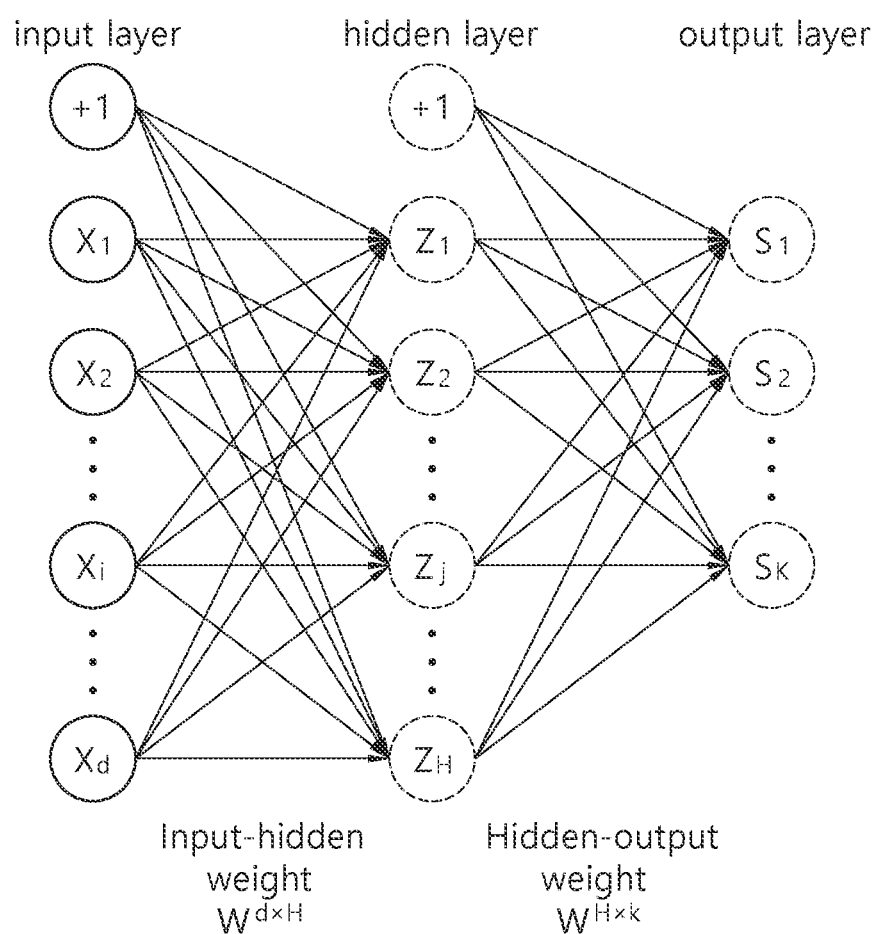
FIG. 6 schematically illustrates an example of a multi-layer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
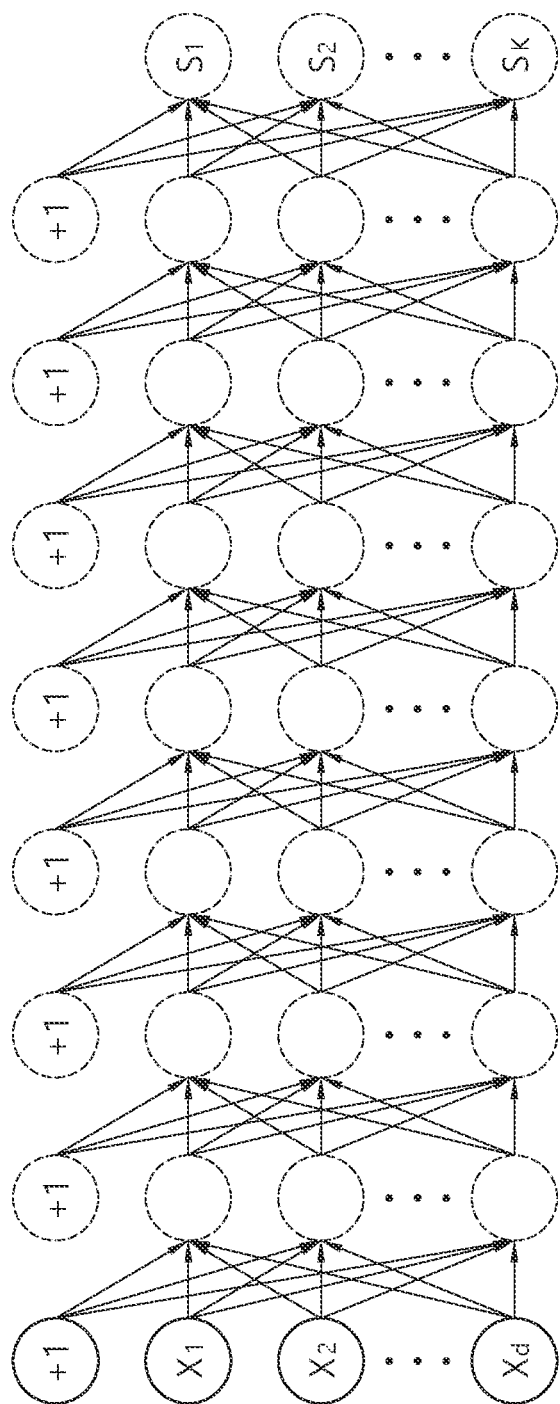
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
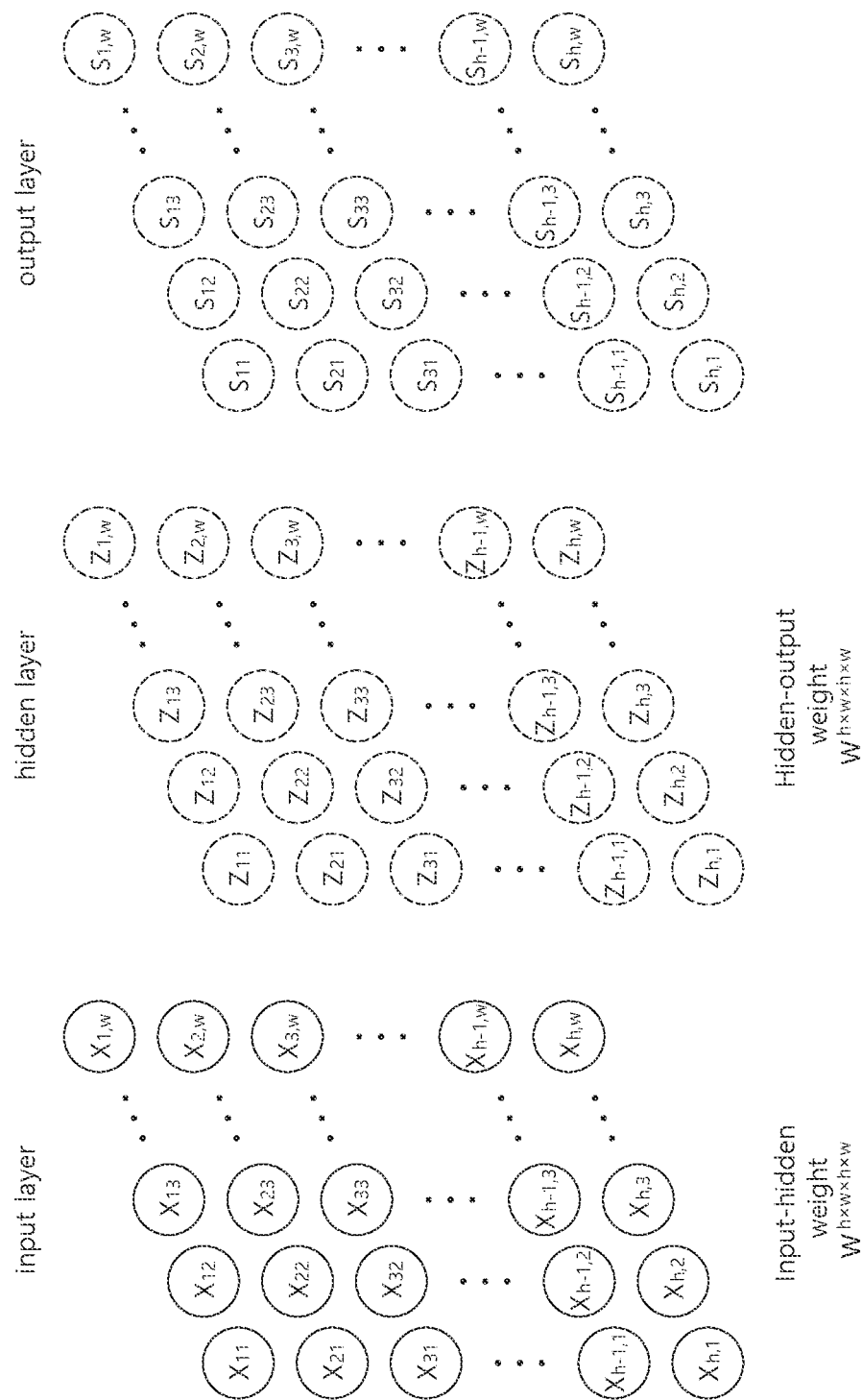
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h×w weights must be considered. Since there are h×w nodes in the input layer, a total of h2w2 weights are required between two adjacent layers.

Figure 9:
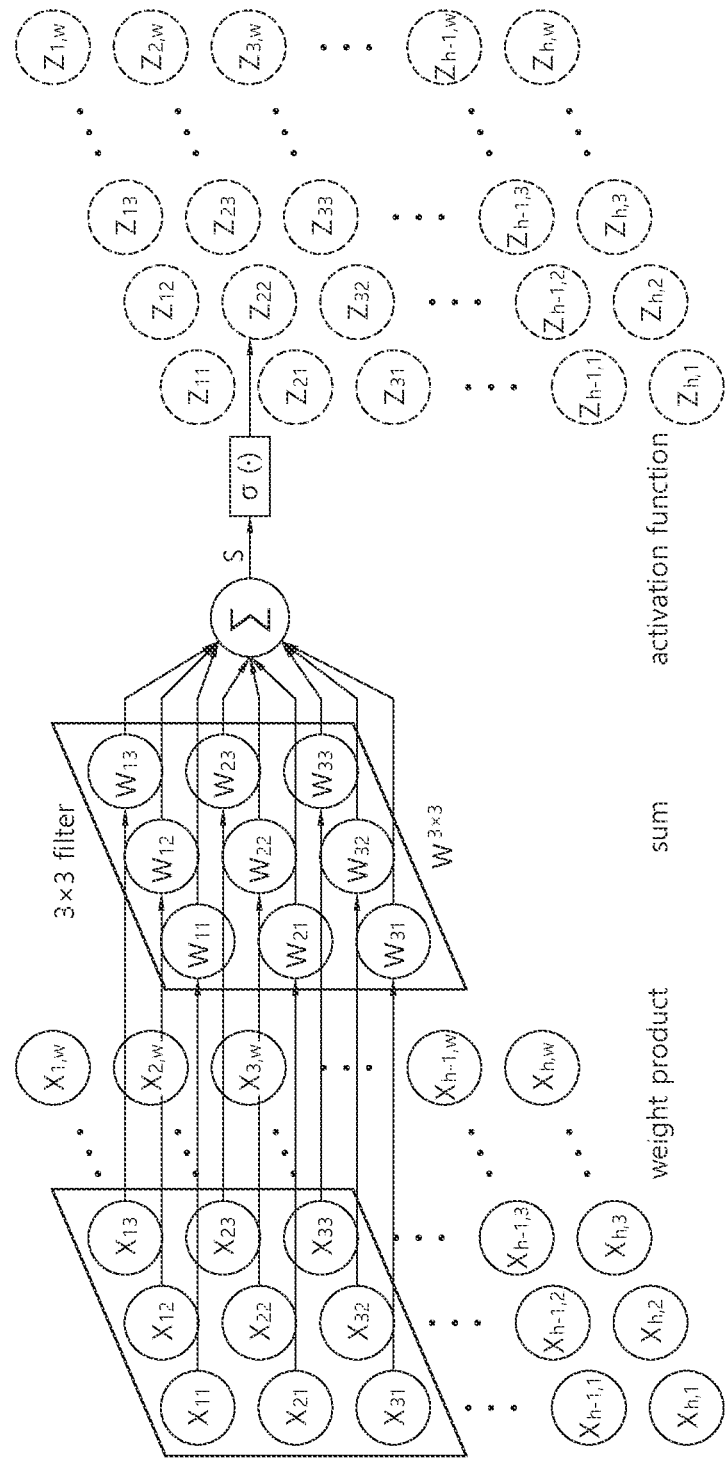
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
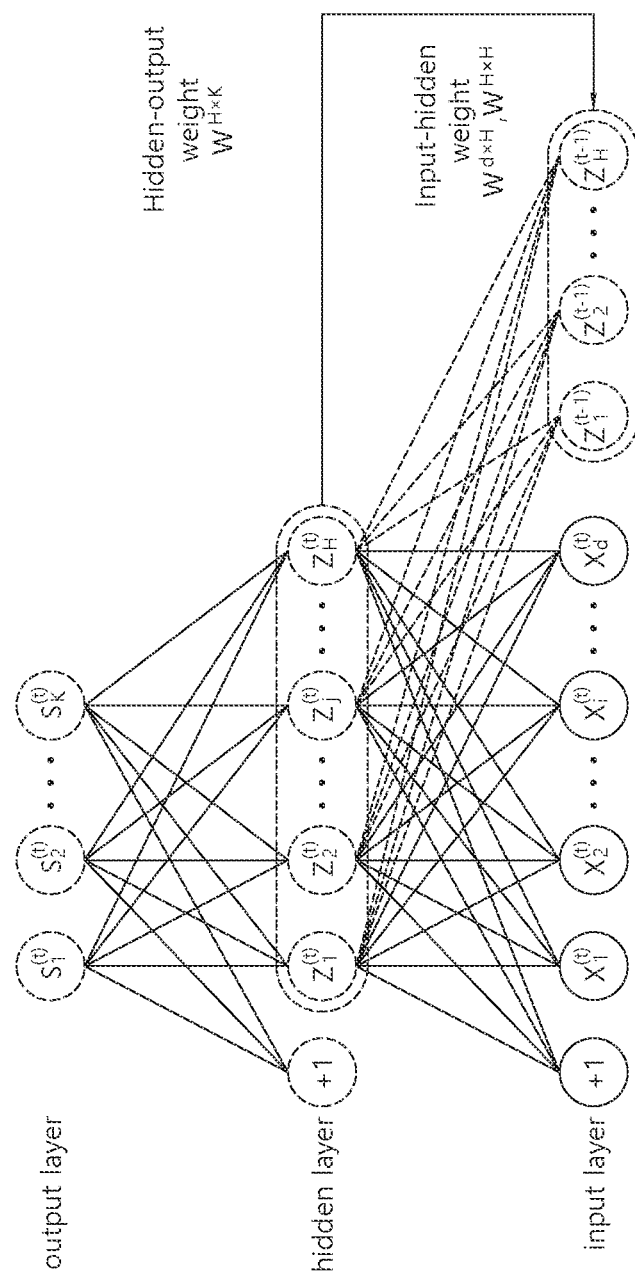
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1(t), x2(t) . . . , xd(t)) of any gaze t on the data sequence to the fully connected neural network, by entering together the hidden vector (z1(t−1), z2(t−1) . . . , zH(t−1)) of the immediately preceding time point t−1. The reason why the hidden vector is transmitted to the next time point in this way is that information in the input vector at previous time points is regarded as being accumulated in the hidden vector of the current time point.

Figure 11:
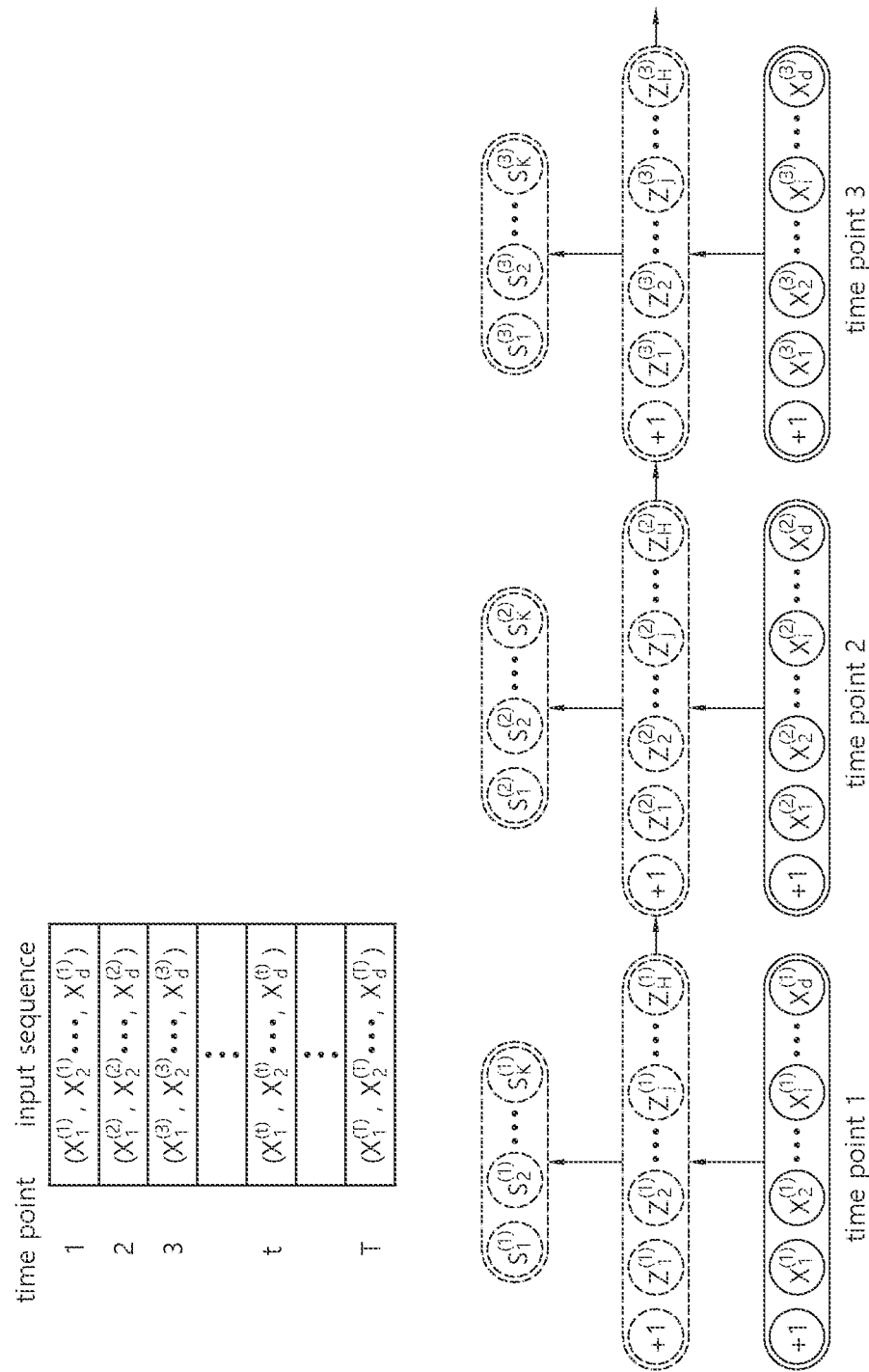
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1), z2(1) . . . , zH(1)) when the input vectors (x1(t), x2(t) . . . , xd(t)) at time point 1 are input to the recurrent neural network is input together with the input vector (x1(2), x2(2) . . . , xd(2)) of time point 2, the vector (z1(2), zH(2)) of the hidden layer is determined through the weighted sum and activation function. This process is repeatedly performed until time point 2, time point 3 . . . , time point T.

Meanwhile, when a plurality of hidden layers is arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz(Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
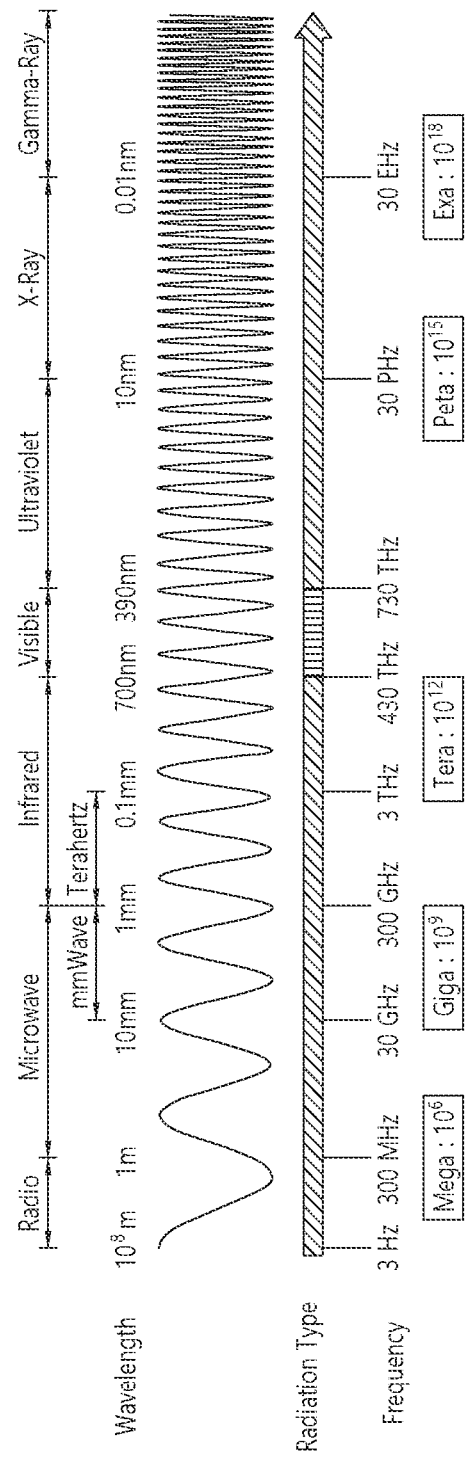
FIG. 12 illustrates an example of an electromagnetic spectrum.

FIG. 12 illustrates an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
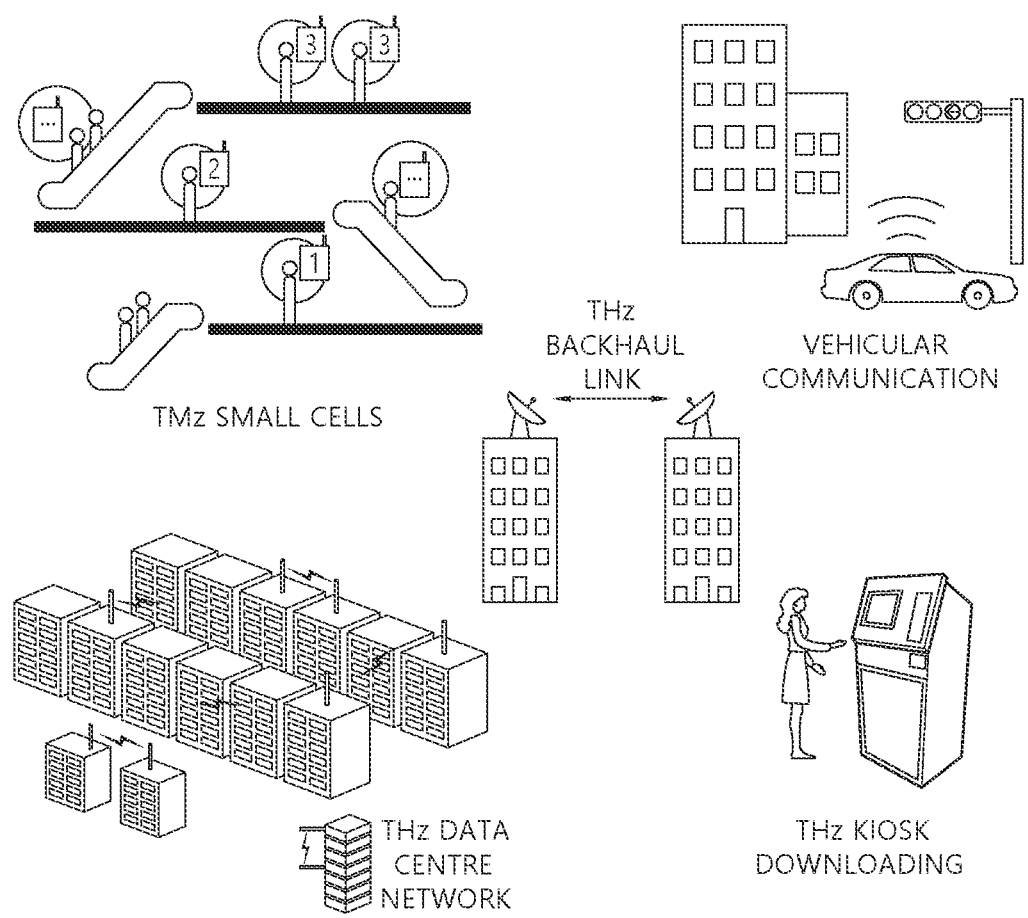
FIG. 13 is a diagram illustrating an example of a THz communication application.

FIG. 13 is a diagram illustrating an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 14:
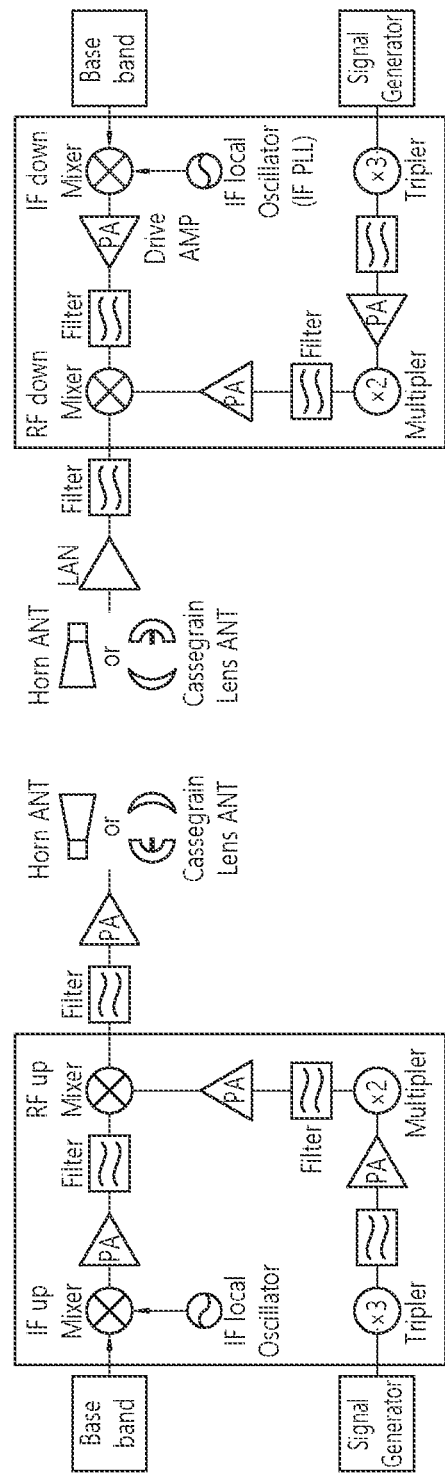
FIG. 14 is a diagram illustrating an example of an electronic element-based THz wireless communication transceiver.
Figure 16:
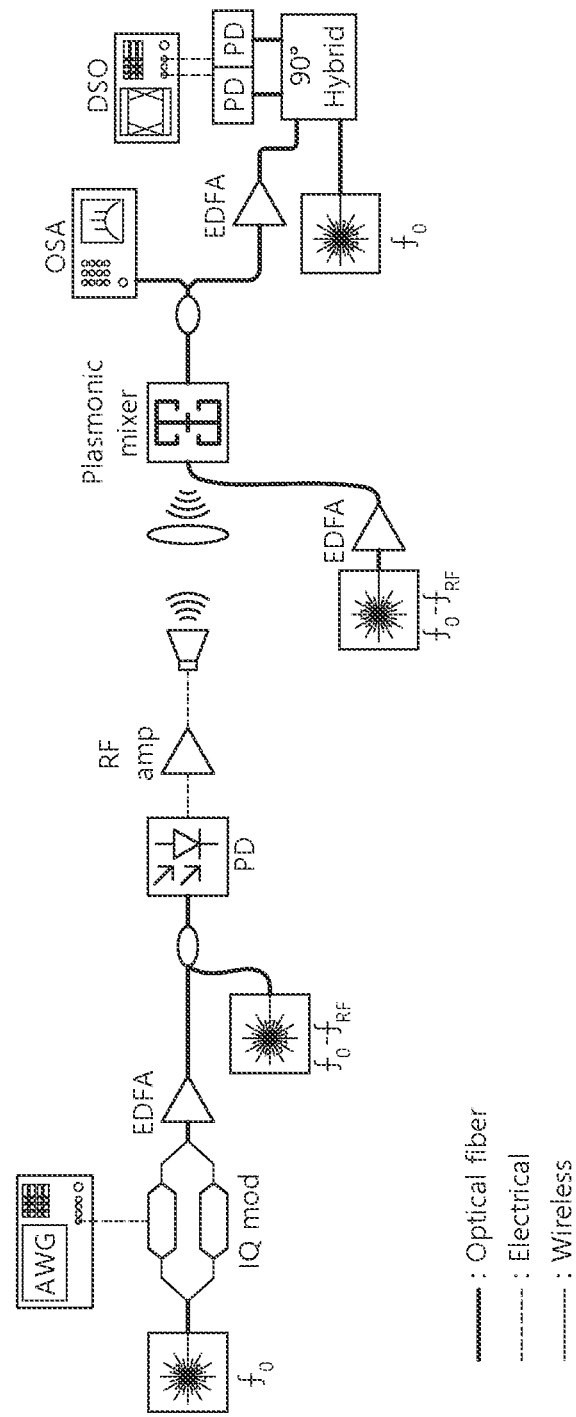
FIG. 16 is a diagram illustrating an example of a THz wireless communication transceiver based on an optical device.

THz wireless communication can be classified based on the method for generating and receiving THz. The THz generation method can be classified as an optical device or an electronic device-based technology. FIG. 14 is a diagram illustrating an example of an electronic element-based THz wireless communication transceiver. the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop. FIG. is a diagram illustrating an example of a method for generating a THz signal based on an optical device, and FIG. 16 is a diagram illustrating an example of a THz wireless communication transceiver based on an optical device.

Figure 15:
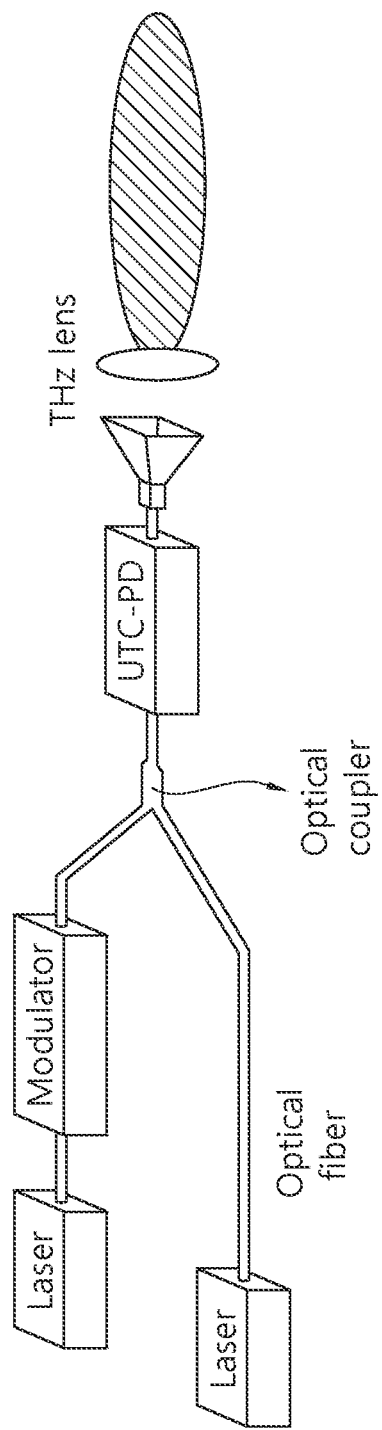
FIG. 15 is a diagram illustrating an example of a method for generating a THz signal based on an optical device.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 15, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 17:
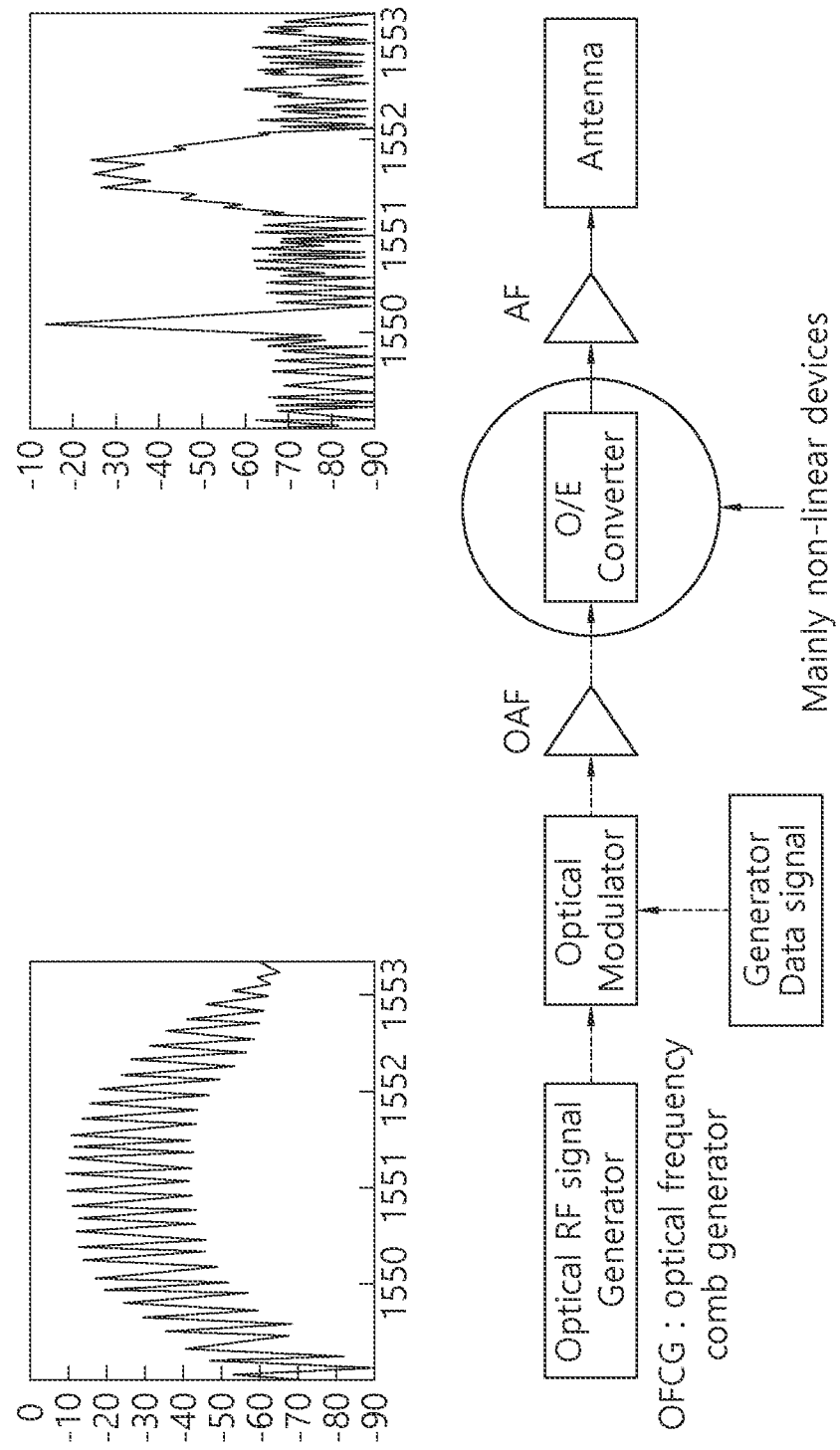
FIG. 17 illustrates a structure of a transmitter based on a photonic source.
Figure 18:
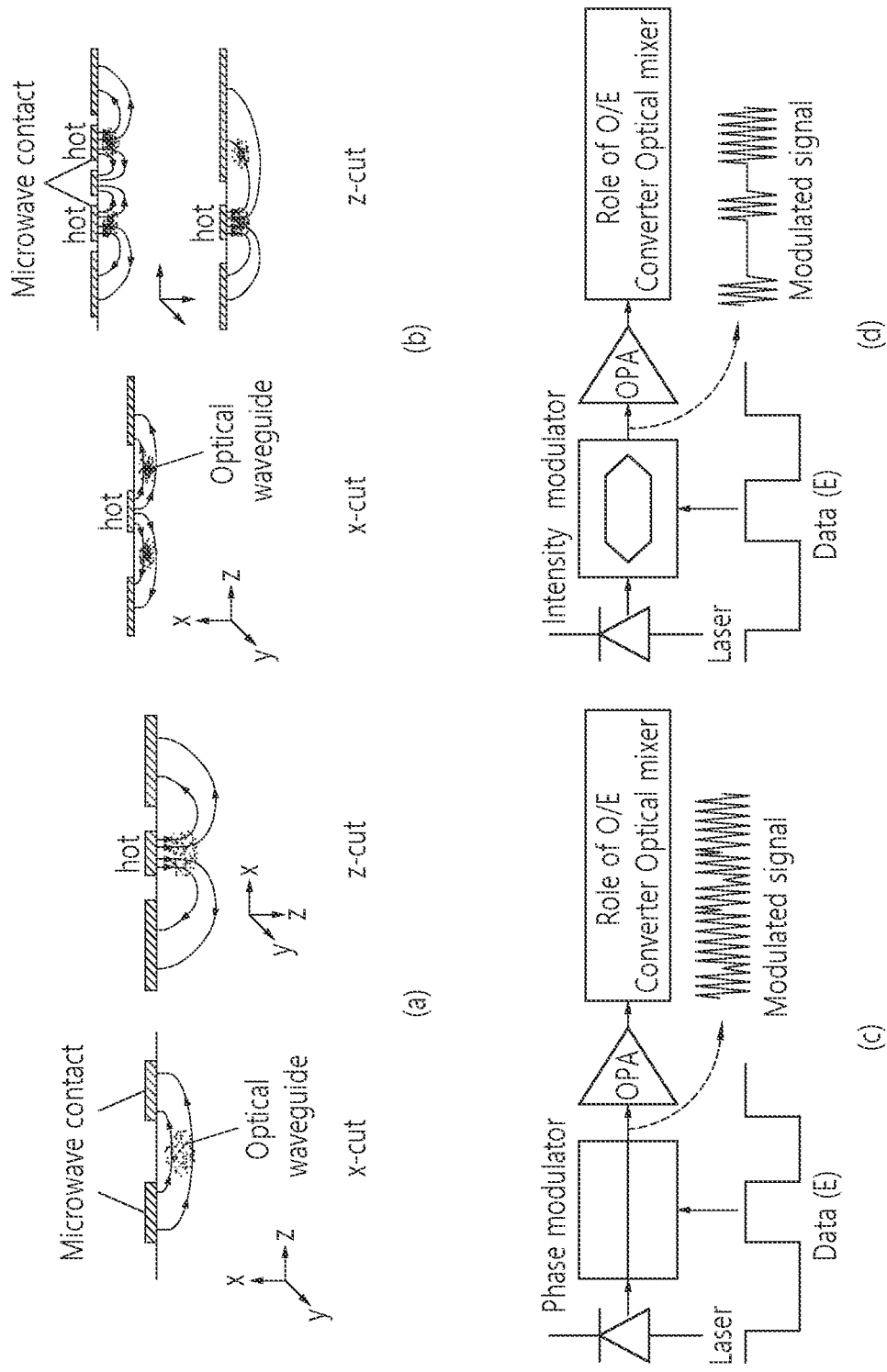
FIG. 18 illustrates a structure of an optical modulator.

The structure of the photoelectric converter (or photoelectric converter) will be described with reference to FIGS. 17 and 18. FIG. 17 illustrates a structure of a transmitter based on a photonic source, and FIG. 18 illustrates a structure of an optical modulator.

Generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Hereinafter, the present disclosure will be described in more detail.

A wireless communication system is widely deployed to provide various types of communication services such as voice or data. In addition, attempts to incorporate artificial intelligence (AI) into communication systems are rapidly increasing. The attempted methods may be largely divided into i) AI for communications (AI4C), which uses AI to improve communication performance, and ii) communications for AI (C4AI), which develops communication technology to support AI. In the area of the AI4C, there is an attempt to design by replacing the role of channel encoder/decoder, modulator/demodulator, or channel equalizer with an auto encoder of an end-to-end or a neural network. In the area of the C4AI, there is a method of updating a common prediction model while protecting personal information, by sharing only the weight or gradient of the model with the server without sharing device raw-data through federated learning which is a technique of distributed learning, The following techniques may be used in various radio access systems such as CDMA, FDMA, TDMA, OFDMA, SC-FDMA, and the like. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with radio technologies such as IEEE 802.11 (Wi-Fi), IEEE 802.16 (WiMAX), IEEE 802-20, and Evolved UTRA (E-UTRA). UTRA is part of the Universal Mobile Telecommunications System (UMTS). 3rd Generation Partnership Project (3GPP) Long Term Evolution (LTE) is a part of Evolved UMTS (E-UMTS) using E-UTRA, and LTE-Advanced (LTE-A)/LTE-A pro is an evolved version of 3GPP LTE. 3GPP New Radio or New Radio Access Technology (3GPP NR) is an evolved version of 3GPP LTE/LTE-A/LTE-A pro. 3GPP 6G may be an evolved version of 3GPP NR.

For clarity of explanation, it is described based on a 3GPP communication system (e.g., LTE, NR, etc.), but the technical spirit of the present disclosure is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to technology after TS 38.xxx Release 15. 3GPP 6G may mean technology after TS Release 17 and/or Release 18. "xxx" means standard document detail number. LTE/NR/6G may be collectively referred to as a 3GPP system. For background art, terms, abbreviations, etc. used in the description of the present disclosure, reference may be made to matters described in standard documents published prior to the present disclosure. For example, the following document can be referred.

3GPP LTE
- 36.211: Physical channels and modulation
- 36.212: Multiplexing and channel coding
- 36.213: Physical layer procedures
- 36.300: Overall description
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification Symbols/abbreviations/terms used in the present disclosure are as follows.
AE: AutoEncoder
NN: Neural Network The application of deep learning-based AI algorithms in the communication environment may be divided into offline learning and online learning. In the communication environment, offline learning may assume that learning is completed before the communication system is activated, and the deep learning AI algorithm is operated in the communication environment based on the learned results. On the other hand, online learning may assume that learning is done even after the communication system is activated, and the deep learning AI algorithm is operated by adaptively reflecting the updated learning results to the activated communication system.

In general, deep learning-based AI algorithms in a communication environment require a lot of training data to optimize training parameters. However, even if a lot of training data is used in offline, it may not be easy to implement an AI algorithm that adapts to all environments due to the diversity of channel environments of the communication environment. If it is assumed that an online learning-based deep learning AI algorithm operates in a communication system, overall communication system performance may be improved since a large number of terminals participating in the communication system contribute to online learning for a long time while the communication system is operating. For this reason, an online learning-based AI algorithm may be considered to support an AI algorithm that adapts to all environments in a communication environment.

In the case of a communication system, since information transmission and decoding are performed by an agreement between a transmitting and receiving end, control information (e.g., CSI, etc.) or system parameters (e.g., TBS, CQI Table, etc.) may exist for maintaining system performance. When a large number of terminals in a communication system improve overall communication system performance through online learning for a long time, the control information or system parameters may need to be changed to reflect the improved performance to the communication system.

Therefore, in a communication system (e.g., B5G, 6G, B6G, etc.) in which a deep learning-based AI algorithm is applied, the rules that cause operations of the transmitter and the receiver to change should be predefined in consideration of the change in communication system performance due to online learning. The rules that cause operations of the transmitter and the receiver to change should be predefined in the form of transmitter and receiver end commitments that allow the operations to change, and a method for indicating the change should be defined.

Hereinafter, for a better understanding of the examples of the present disclosure, the disclosure will be described with reference to the drawings. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 19:
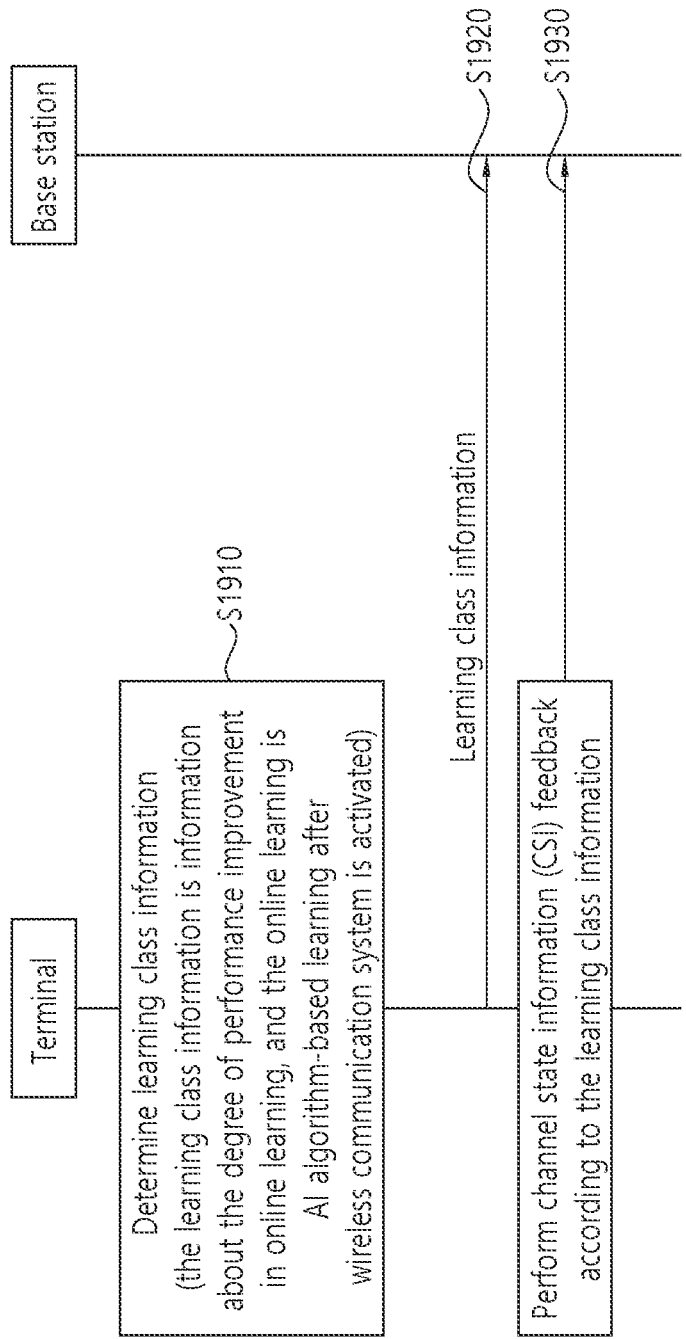
FIG. 19 is a flowchart of a method for transmitting learning class information according to an embodiment of the present disclosure.

FIG. 19 is a flowchart of a method for transmitting learning class information according to an embodiment of the present disclosure.

The terminal may determine learning class information (S1910). Here, the learning class information may be information about the degree of performance improvement in online learning. Here, the online learning may be artificial intelligence (AI) algorithm-based learning after the wireless communication system is activated. As more specific details thereof are described above and/or hereinafter, repetitive descriptions will be omitted for ease of explanation.

The terminal may transmit learning class information to the base station (S1920). As more specific details thereof are described above and/or hereinafter, repetitive descriptions will be omitted for ease of explanation.

The terminal may perform channel state information (CSI) feedback according to learning class information (S1930). Here, while the drawings illustrate a configuration in which the terminal performs CSI feedback, the embodiments provided herein are not required to perform CSI feedback. That is, independent of the configuration in which the terminal performs CSI feedback, embodiments of the present disclosure may provide only a configuration in which the terminal transmits learning class information. As more specific details thereof are described above and/or hereinafter, repetitive descriptions will be omitted for ease of explanation.

For example, a plurality of channel quality indicator (CQI) tables may be shared between the terminal and the base station. As more specific details thereof are described above and/or hereinafter, repetitive descriptions will be omitted for ease of explanation.

For example, the terminal may perform the CSI feedback based on a CQI table tied with the learning class information among the plurality of CQI tables. As more specific details thereof are described above and/or hereinafter, repetitive descriptions will be omitted for ease of explanation.

For example, when performing the CSI feedback, the terminal may transmit at least one of Channel Quality Information (CQI), Precoding Matrix Indicator (PMI), Layer Indicator (LI), and Rank Indicator (RI) to the base station. As more specific details thereof are described above and/or hereinafter, repetitive descriptions will be omitted for ease of explanation.

Here, for example, the terminal may perform the CSI feedback differently according to the learning class information. As more specific details thereof are described above and/or hereinafter, repetitive descriptions will be omitted for ease of explanation.

Here, for example, when the learning class information indicates that the degree of performance improvement is high, the terminal may transmit a small amount of information to the base station through the CSI feedback. As more specific details thereof are described above and/or hereinafter, repetitive descriptions will be omitted for ease of explanation.

Here, for example, when the learning class information indicates that the degree of performance improvement is low, the terminal may transmit a large amount of information to the base station through the CSI feedback. As more specific details thereof are described above and/or hereinafter, repetitive descriptions will be omitted for ease of explanation.

Here, for example, the learning class information may indicate any one of a first class, a second class, a third class, and a fourth class, the second class may have a higher degree of performance improvement than the first class, the third class may have a higher degree of performance improvement than the third class, and the fourth class may have a higher degree of performance improvement than the third class.

Meanwhile, describing the learning class information as four classes in the present disclosure is only an example of the configuration to be provided in the present disclosure. That is, the learning class information may be divided into two classes, three classes, and the like. Alternatively, the learning class information may consist of only one class. As more specific details thereof are described above and/or hereinafter, repetitive descriptions will be omitted for ease of explanation.

Here, for example, based on the learning class information indicating the first class, the terminal may transmit the CQI, the PMI, the LI, and the RI to the base station. And, based on the learning class information indicating the second class or the third class, the terminal may transmit the CQI and the PMI to the base station. And, based on the learning class information indicating the fourth class, the terminal may transmit only the CQI to the base station.

Meanwhile, in the above example, a matching relationship between learning class information and transmitted CSI (e.g., CQI, PMI, LI, RI, etc.) may be only an exemplary configuration. For example, for the first class, the terminal may transmit only the CQI, transmit the CQI and PMI, or transmit information separate from these. As more specific details thereof are described above and/or hereinafter, repetitive descriptions will be omitted for ease of explanation.

Here, for example, based on predefined measurement criteria, the terminal may determine which one of the first class, the second class, the third class, and the fourth class the learning class information indicates. As more specific details thereof are described above and/or hereinafter, repetitive descriptions will be omitted for ease of explanation.

Hereinafter, more specific examples of the embodiments of the present disclosure will be summarized.

1. Learning Class & Learning Class Evaluation Criteria

When online learning is applied to a communication system with a deep learning-based AI algorithm, learning classes are classified and defined according to the degree of performance improvement based on predefined evaluation criteria. That is, the learning class indicates the degree of improvement performance according to the learning degree of online learning. For example, when a learning class having N number of stages is defined, it may be defined as follows.

Learning class 0: Class stage for a communication system that operates based on the system performance determined at the point when the communication system to which the deep learning-based AI algorithm is applied is activated (e.g., 6G starting point)

Learning class $½/$ . . . $/N-2$: Class stage for a communication system that operates based on predefined expected classification system performance Learning Class N-1: Class stage for a communication system that operates based on optimal system performance.

That is, learning class instructs that the communication system suitable for learning class 0 operates at the time the communication system is activated, but communication system suitable for learning class from 1 to N-2 operates as performance improvement is achieved by online learning. When the performance improvement made by online learning reaches the theoretical optimum, the communication system suitable for learning class N-1 operates.

In the above, the evaluation criteria for defining the degree of performance improvement may be a level for target performance predefined for the communication system to which the AI algorithm is applied. For example, the level for the target performance may be predefined as Block Error Rate (BLER) performance, and the evaluation criteria for the AI MIMO detector among the AI algorithms are schematized as follows.

Figure 20:
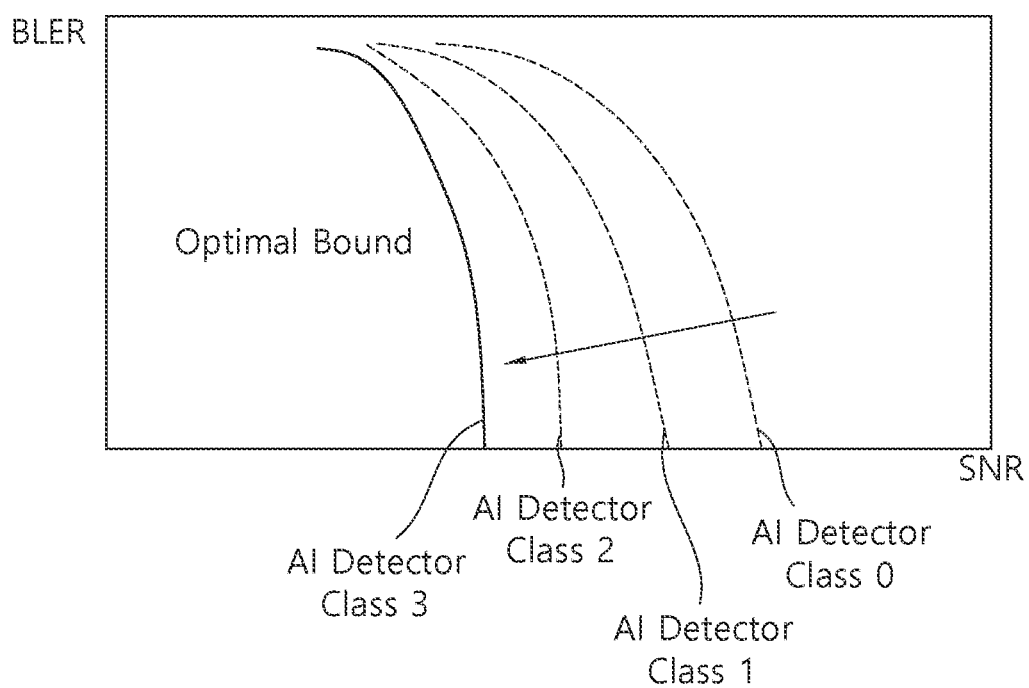
FIG. 20 schematically illustrates an example of evaluation criteria for an AI MIMO detector.

FIG. 20 schematically illustrates an example of evaluation criteria for an AI MIMO detector.

In the above, the AI detector class x indicates a level for target performance as evaluation criteria and is predefined. In the above example, the optimal bound may be assumed to be a theoretical optimal performance, such as a Codeword Level Maximal Likelihood (CW-ML) detector. In the above example, assuming that the AI detector class is divided into four as evaluation criteria and tied to four learning classes, it may be promised in advance in the form of the following.

TABLE 3

Evaluation criteria

| AI detector class | SNR Criteria for Target BLER = 1e−2 | | Learning class |
|---|---|---|---|
| 0 | 20 dB | Initial Performance | 0 |
| 1 | 15 dB | Performance Improvement Level 1 | 1 |
| 2 | 10 dB | Performance Improvement Level 2 | 2 |
| 3 | 5 dB | Achieve Optimal Bound | 3 |

In the above example, the evaluation criteria assumes a communication system with an SNR level of 20 dB that satisfies the target BLER 1e-2. When the performance of the AI detector is improved by online learning and the SNR level that satisfies the target BLER 1e-2 becomes 15 dB, the AI detector class becomes AI detector class 1, and the tied learning class 1 may be selected. The AI detector class index and the learning class index may be determined in the same way. In the above, the evaluation criteria may be different for each Modulation Coding Scheme (MCS) level for a Physical Resource Block (PRB) allocated in advance for data transmission. For example, since the BLER performance differs according to the MCS level that operates adaptively to the channel environment, it is possible to set different evaluation criteria for the AI detector for each MCS level.

In the above, the evaluation criteria may be different for each Transport Block Size (TBS). In this case, in a system in which the MCS index and the TBS index are tied (e.g., LTE/LTE-A), the evaluation criteria may be set differently according to one of the MCS index and the TBS index. In addition, the evaluation criteria may be different for each code block size in a system (e.g., NR) transmitting for each code block for latency reduction for the HARQ process.

In the above, the evaluation criteria may be mapped with the learning class as 1:M or M:1. In this case, M is a positive integer value.

Although the evaluation criteria are described from the AI detector point of view above, it is obvious that they can be determined in the same way in a communication system in which a deep learning-based AI algorithm is applied to both transmitting and receiving ends such as an auto-encoder.

In the above, the evaluation criteria for defining the degree of performance improvement may be control information that should be exchanged to achieve a predefined target threshold for a communication system to which an AI algorithm is applied. For example, a threshold value for target performance may be predefined as BLER performance, and the target threshold value is schematized as follows.

Figure 21:
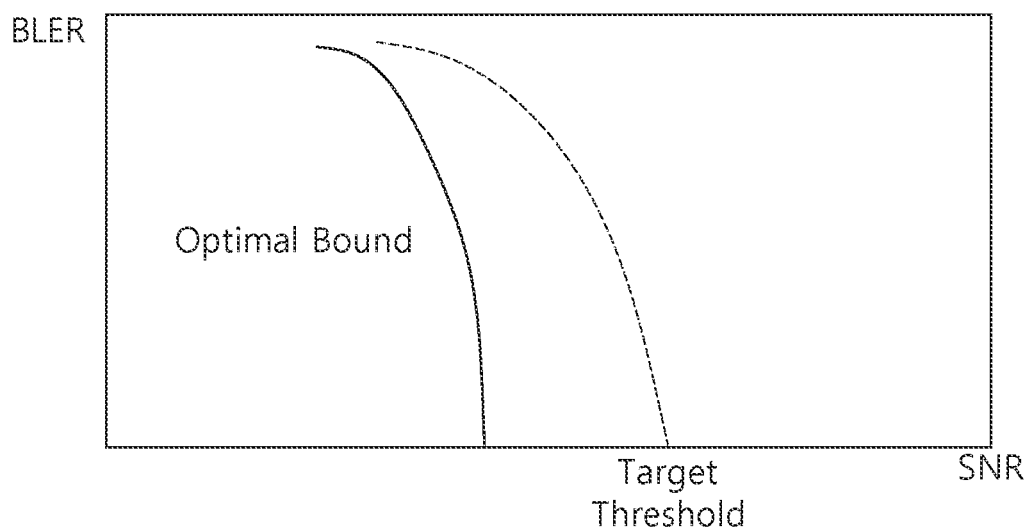
FIG. 21 schematically illustrates an example of a target threshold value.

FIG. 21 schematically illustrates an example of a target threshold value.

In the above, the target threshold value is predefined. In the above example, assuming that required control information that satisfies the target threshold as evaluation criteria is divided into 4 levels and tied to 4 learning classes, it may be pre-promised in the following form.

TABLE 4

| Evaluation criteria (Required control information) | Learning class |
|---|---|
| CQI, PMI, LI, RI | 0 |
| CQI, PMI | 1 |
| CQI | 2 |
| — | 3 |

In the above example, assuming that an SNR threshold value that satisfies a predefined target BLER is the target threshold value, the evaluation criteria is defined as required control information that achieves the target threshold value. In the initial learning class 0 state, if the performance of the system is improved by online learning and the target threshold value is achieved only with CQI and PMI feedback, it may be converted to learning class 1 state. And if the target threshold value is achieved only with CQI feedback in the same way, it may be converted to learning class 2 state. And if the target threshold value is achieved without feedback, it may be converted to learning class 3 state. That is, the learning class index may be determined according to required control information that achieves a predefined target threshold value, and the rule is predefined. Meanwhile, in the above example, matching relationship between the learning class information and the transmitted CSI (e.g., CQI, PMI, LI, RI, etc.) may be merely an exemplary configuration. For example, even for learning class 0, the terminal may transmit only the CQI, transmit the CQI and PMI, or transmit separate information.

In addition, a matching relationship for CSI transmitted in learning class 1, learning class 2, learning class 3, etc., may also be merely an exemplary configuration.

In addition to this, in the table above, the learning classes are classified into a total of four, but this is also merely an exemplary configuration. That is, learning classes are not classified into only four types, but may be classified into several types according to various criteria.

In addition, as more specific details thereof are described above and/or hereinafter, repetitive descriptions will be omitted for ease of explanation.

It is obvious that the learning class index may be determined for other control information in addition to the required control information exemplified above.

In the above, the target threshold value may be different for each MCS level for a PRB pre-allocated for data transmission. For example, since the BLER performance differs according to the MCS level that operates adaptively to the channel environment, the target threshold value for the system may be set differently for each MCS level.

In the above, the target threshold value may be different for each TBS. In this case, in a system (e.g., LTE/LTE-A) in which the MCS index and the TBS index are tied, the target threshold may be set differently according to one of the MCS index and the TBS index. In addition, in a system (e.g., NR) transmitting by code block for latency reduction for the HARQ process, the target threshold value may be different for each code block size.

Although the target threshold value is described in terms of the BLER indicator above, it is obvious that it may be determined in the same way through other indicators such as delay requirement and spectral efficiency.

In the above, the evaluation criteria defining the degree of performance improvement may be a reference signal pattern or density that should be used to achieve a target threshold value predefined for the communication system to which the AI algorithm is applied. For example, assuming that a Reference Signal (RS) pattern that satisfies a target threshold as evaluation criteria is divided into 4 stages and tied to 4 learning classes, it may be pre-promised in the form of the following.

TABLE 5

| Evaluation criteria (Reference signal pattern/density) | Learning class |
|---|---|
| Pattern 1 (density level 1) | 0 |
| Pattern 2 (density level 2) | 1 |
| Pattern 3 (density level 3) | 2 |
| Pattern 4 (density level 4) | 3 |

In the above example, assuming that an SNR threshold value that satisfies a predefined target BLER is the target threshold value, the evaluation criteria is defined as a reference signal pattern that achieves the target threshold value. When the performance of the system is improved by online learning in the learning class 0 state using the initial RS pattern 1, and the target threshold value is achieved with the RS pattern 2 having a lower RS density, it may be converted to the learning class 1 state. And if the target threshold value is achieved with the RS pattern by RS density in the same way, the learning class may be converted. That is, a learning class index may be determined according to an RS pattern index that achieves a predefined target threshold value, and the rule is predefined.

Meanwhile, in the above example, the matching relationship between the learning class information and the pattern may be merely an exemplary configuration. In addition to this, in the table above, the learning classes are classified into a total of four, but this is also only an exemplary configuration. That is, learning classes are not classified into only four types, but may be classified into several types according to various criteria.

In addition, as more specific details thereof are described above and/or hereinafter, repetitive descriptions will be omitted for ease of explanation.

In the above, the target threshold value may be different for each MCS level for a PRB pre-allocated for data transmission. For example, since the BLER performance differs according to the MCS level that operates adaptively to the channel environment, the target threshold value for the system may be set differently for each MCS level.

In the above, the target threshold value may be different for each TBS. In this case, in a system (e.g., LTE/LTE-A) in which the MCS index and the TBS index are tied, the target threshold may be set differently according to one of the MCS index and the TBS index. In addition, in a system (e.g., NR) transmitting by code block for latency reduction for the HARQ process, the target threshold value may be different for each code block size.

2. Learning Class Evaluation Process

When online learning is applied to a communication system with a deep learning-based AI algorithm, it is proposed a method for measuring system performance based on predefined evaluation criteria and selecting and delivering a learning class index based on the measured performance.

2.1 Learning Class Evaluation Process for AI MIMO Detector-Based Communication System When the transmitting end encodes/modulates the data s to be transmitted in a pre-arranged manner and transmits the signal x to the receiving end, the received signal at the receiving end may be expressed to Y=Hx+n. When the channel estimated through a technique such as channel estimation at the receiving end is referred to H, the signal decoding method through the AI MIMO detector may be schematized as follows.

Figure 22:
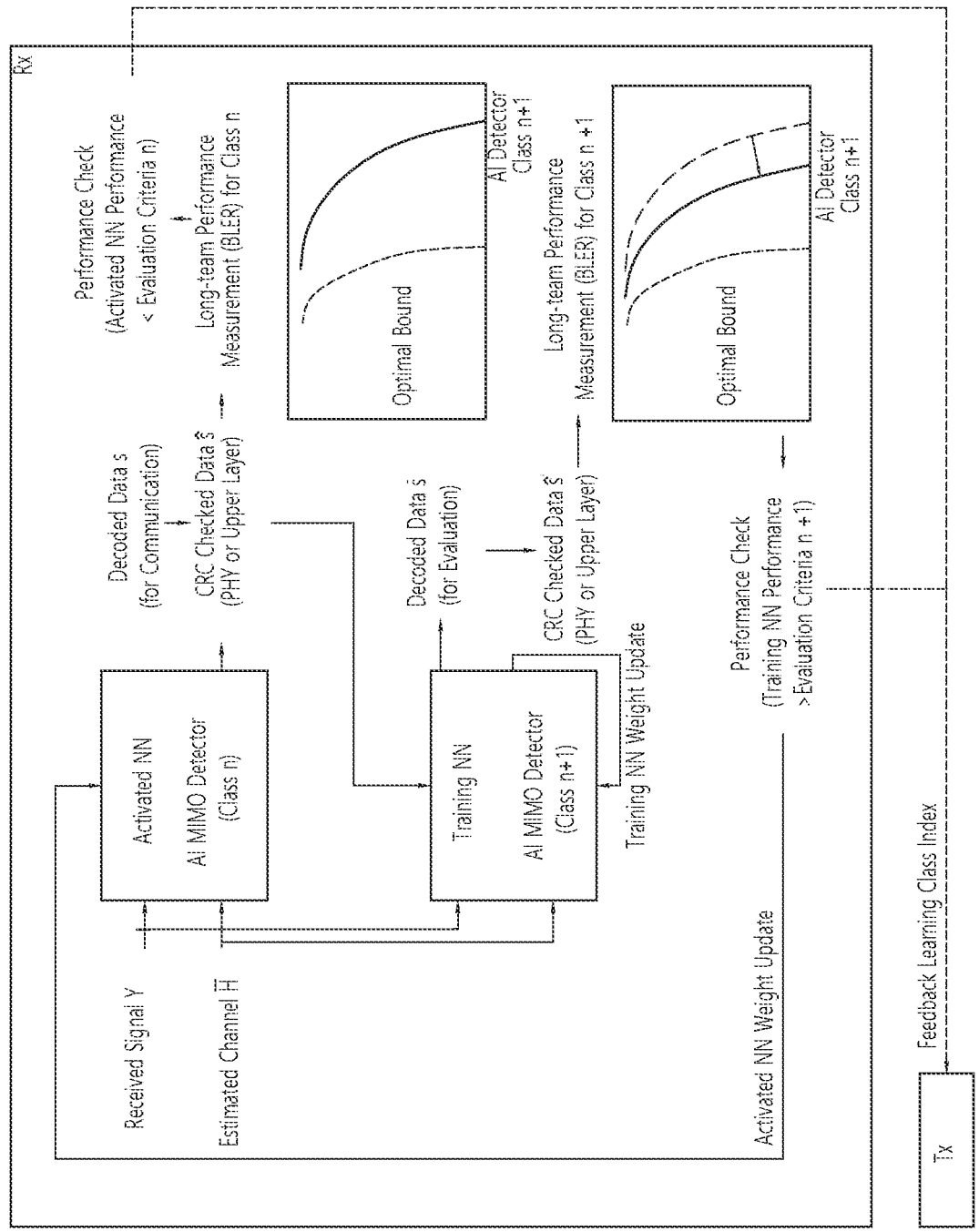
FIG. 22 schematically illustrates an example of a signal decoding method through an AI MIMO detector.

FIG. 22 schematically illustrates an example of a signal decoding method through an AI MIMO detector.

In the above, the receiving end is equipped with two AI MIMO detectors that derive decoded data s based on the received signal Y and the estimated channel H. In this case, one AI MIMO detector is an activated NN used for communication purposes, and the other AI MIMO detector is a training NN for online learning. In the above, the training NN may have an AI detector class index higher than the activated NN by one. For example, for a communication system to which an AI MIMO detector is applied, the activated NN in the initial state is an AI detector class 0, and it is assumed a state tied to learning class 0 as class step for communication system operated based on the system performance determined at the time (e.g., 6G starting point) the communication system is activated. The training NN in the initial state is a device that performs training to achieve the performance of the AI detector class 1, and performs training through decoded data s derived through the received signal Y, the estimated channel H̄, and the active NN. And, through this, decoded data s̄' may be derived, and the weight of the training NN is updated based on the information s̄' for which ACK is confirmed through CRC check. In this case, the CRC check may be determined by a physical layer procedure or through higher layer information.

In the above, long-term performance measurement is performed by the CRC check on the decoded data s̄ derived through the activated NN. When the AI detector class of the activated NN is in state n, it is evaluated whether the evaluation criteria of AI detector class n is satisfied through long-term performance measurement. In this case, if the evaluation criteria of AI detector class n is not satisfied (activated NN performance <evaluation criteria n), it is set to AI detector class index=AI detector class index−1(AI detector class index=n−1), and the learning class index tied to the newly set AI detector class index of the activated NN is fed back to Tx. In the above, when n is 0, feedback may not be performed. In the above, the above procedure may be omitted in a system in which performance is always increased by online learning.

In the above, long-term performance measurement is performed by the CRC check or evaluation on the decoded data g' derived through the training NN. When the AI detector class of the training NN is in state n+1, it is evaluated whether the evaluation criteria of the AI detector class n+1 is satisfied through long-term performance measurement. In this case, if the evaluation criteria of the AI detector class n+1 is satisfied (training NN performance >evaluation criteria n+1), the weight of the activated NN is updated based on the weight of the updated NN through training. In addition, the AI detection class index of the activated NN and the AI detector class index of the training NN are increased by one (AI detection class index of the activated NN=n+1, AI detection class index of the training NN=n+2). In addition, the learning class index tied to the newly set AI detector class index of the activated NN is fed back to Tx.

In the above, the relationship between the learning class or the AI detector class and the evaluation criteria follows example in 1.

2.2 Learning Class Evaluation Process for Auto-Encoder-Based Communication System When the transmitting end encodes/modulates the data s to be transmitted through an auto-encoder (AE) and transmits the signal x to the receiving end, the received signal at the receiving end may be expressed as Y=Hx+n. When the channel estimated through a technique such as channel estimation at the receiving end is referred to as Ḧ, the signal decoding method through the auto-encoder at the receiving end may be schematized as follows.

Figure 23:
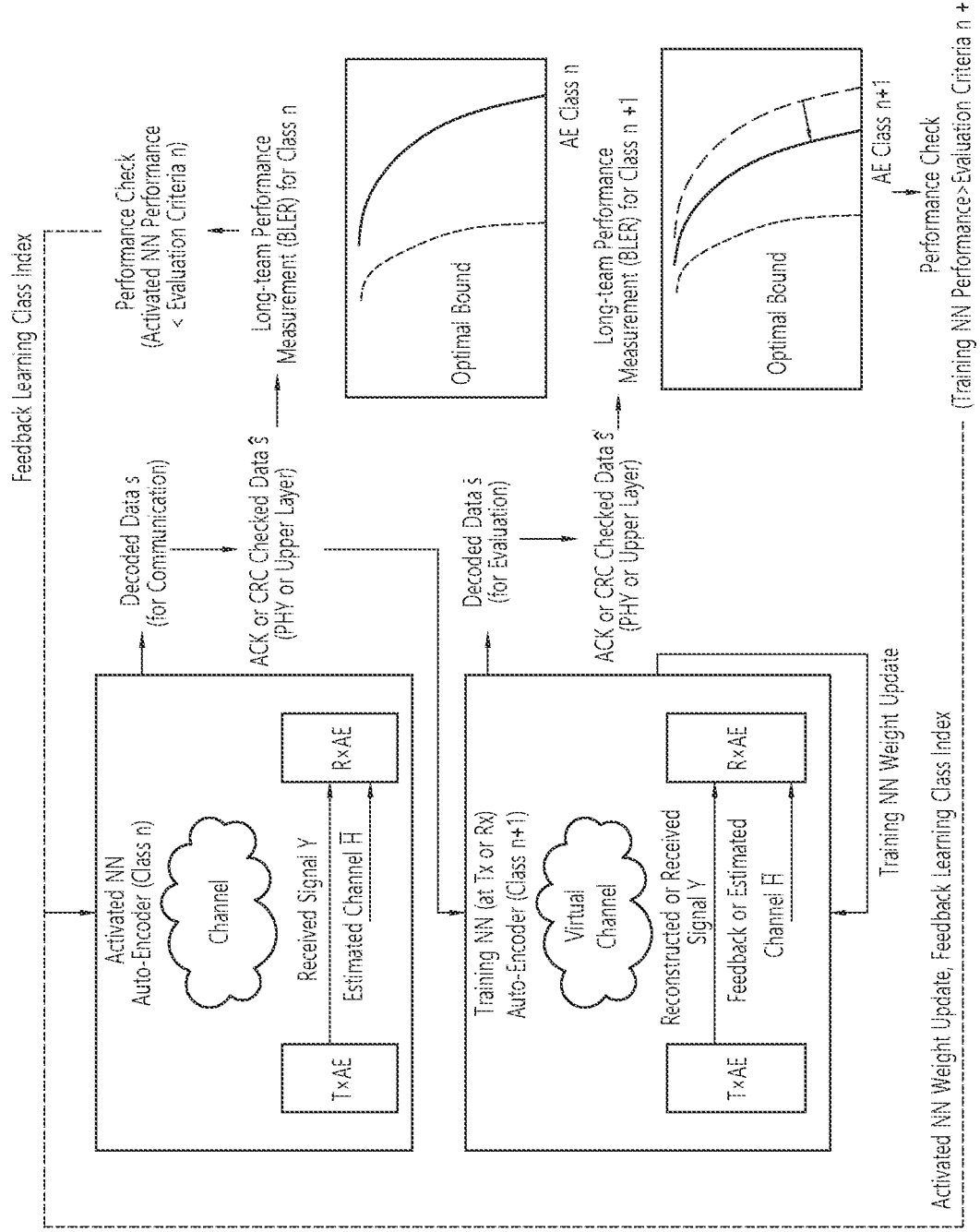
FIG. 23 schematically illustrates an example of a signal decoding method through an auto-encoder of a receiving end.

FIG. 23 schematically illustrates an example of a signal decoding method through an auto-encoder of a receiving end.

In the above, in the transmitting end, a Tx AE device that converts data s to be transmitted into a signal x may be equipped inside the activated NN. In the receiving end, an Rx AE that derives decoded data S based on the received signal Y and the estimated channel H may be equipped inside the activated NN. That is, the activated NN may be formed by a Tx AE of the transmitter and channel, and an Rx AE of the receiver. In the above, the training NN may be equipped on either the transmitting end or the receiving end. The training NN may be formed by a Tx AE for performing online learning, a virtual channel, and an Rx AE.

If the training NN exists in Tx, the receiving end performs feedback on Ack information for the decoded data s, an estimated channel H and the received signal Y to the transmitting end. In this case, depending on the AE operation method, some of the above information may not be fed back. For example, the received signal Y may be reconstructed by generating random noise without feedback on the received signal Y In the above, since the training NN exists only in Tx, Tx AE and Rx AE for training are equipped, and training is performed by configuring a virtual channel, and training NN weights may be updated only in Tx.

If the training NN exists in Rx, the receiving end knows Ack information for the decoded data s, the estimated channel H, and information on the received signal Y, so training may be performed without exchanging information with the transmitting end. In the above, since the training NN exists only in Rx, Tx AE and Rx AE for training are equipped, and training is performed by configuring a virtual channel, and training NN weights may be updated only in Rx.

In the above, the training NN may have an AE class index higher than the activated NN by one. For example, for a communication system to which AE is applied, the activated NN in the initial state is AE class 0, and it may be assumed a state tied to learning class 0 as class step for a communication system operating based on the system performance determined at the time (e.g., 6G starting point) the communication system is activated. The training NN in the initial state is a device that performs training to achieve the performance of AE class 1, and performs training through the received signal Y, the estimated channel H̄, and decoded data s̄' derived through the activated NN. And, through this, decoded data s̄' may be derived, and the weight of the training NN is updated based on the information ŝ' for which ACK is confirmed through CRC check. In this case, the CRC check may be determined by a physical layer procedure or through higher layer information.

In the above, long-term performance measurement is performed by CRC check on the decoded data s̄ derived through the activated NN. When the AE class of the activated NN is in state n, it is evaluated whether the evaluation criteria of AE class n is satisfied through long-term performance measurement. In this case, if the evaluation criteria of AE class n is not satisfied (activated NN performance <evaluation criteria n), it is set to AE class index=AE class index−1 (AE class index=n−1), and the learning class index tied to the newly set AE class index of the activated NN is fed back to Tx. In the above, when n is 0, feedback may not be performed. In the above, the above procedure may be omitted in a system in which performance is always increased by online learning. The long-term performance measurement for the activated NN may be performed only at the receiving end.

In the above, long-term performance measurement is performed by CRC check or evaluation on the decoded data ŝ' derived through the training NN. In the above, the long-term performance measurement for the training NN may be performed only in the device where the training NN is located. When the AE class of the training NN is in a state n+1, it is evaluated whether the evaluation criteria of the AE class n+1 is satisfied through long-term performance measurement. In this case, if the evaluation criteria of the AE class n+1 is satisfied (training NN performance>evaluation criteria n+1), the weight of the activated NN is updated based on the weight of the NN updated through training. In addition, the AE class index of the activated NN and the AE class index of the training NN are increased by one (AE class index of activated NN=n+1, AE class index of training NN=n+2). In this case, if the training NN exists in Tx, the updated information of the activated NN weight and the increased AE class index of the activated NN is fed forward to the receiving end. If there are multiple receiving ends, it may be multicast or broadcast. On the other hand, if the training NN exists in Rx, the updated information of the activated NN weight and the increased AE class index of the activated NN are fed back to the transmitting end. In the above, information exchange on the newly set AE class index of the activated NN may be replaced with information exchange on the learning class index tied to the AE class index of the activated NN.

In the above, the relationship between the learning class or AE class and the evaluation criteria may be set in the same way as 1.

3. Standard Class Adaptation Through Learning Class

When online learning is applied to a communication system with a deep learning-based AI algorithm, a method in which a predefined adaptation spec is tied to a learning class index is proposed.

Adaptation spec predefined in the system may be exemplified as follows.

Adaptation spec: CQI table, TBS table, RS pattern (# of RSs or RS density), feedback period As an example of the CQI table among the above adaptation spec, the following table may be provided. Here, for example, Table 6 may be CQI table 1, Table 7 may be CQI table 2, and Table 8 may be CQI table 3.

TABLE 6

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 7

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 8

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Then, the learning class and the CQI table may have the following relationship.

TABLE 9

| Learning class | CQI table |
|---|---|
| 0 | 3 |
| 1 | 1 |
| 2 | 1 |
| 3 | 2 |

In the above, CQI table 3 tied to learning class 0 is activated in the communication system to which the initial deep learning-based AI algorithm is applied. When performance is improved by online learning, CQI table 1 corresponding to learning class 1 or 2 is activated, and control signaling operation suitable for a system achieving higher spectral efficiency is performed. In the same way, if more performance is improved by online learning, CQI table 2 corresponding to learning class 3 is activated, and control signaling operation suitable for a system achieving higher spectral efficiency may be performed.

Meanwhile, in the above example, the matching relationship between the learning class information and the pattern may be merely an exemplary configuration. In addition to this, in the table above, the learning classes are classified into a total of four, but this is also merely an exemplary configuration. That is, learning classes are not classified into only four types, but may be classified into several types according to various criteria.

In addition, as more specific details thereof are described above and/or hereinafter, repetitive descriptions will be omitted for ease of explanation.

In a similar way, among the adaptation spec, the TBS table may be promised as Table 7.1.7.1-1 and Table 7.1.7.1-2 of 3GPP TS 36.213 or Table 5.1.3.2-1 of 3GPP TS 38.214. It is defined multiple TBS tables in a communication system (e.g., B5G, 6G, B6G, etc.) to which a deep learning-based AI algorithm is applied, and when performance is improved by online learning, operation for the TBS table tied to the learning class index according to the learning class index change may be made.

In a similar way, it is obvious that, among the adaptation spec, multiple RS patterns (# of RSs or RS density), feedback periods, etc., are defined, and tied to learning classes.

It is obvious that adaptation spec not mentioned above may be adaptively operated by being tied to the learning class index in the same way.

In the above, an adaptation spec that should be operated only by recognizing a learning class index between a transmitting and receiving end may be promised.

In the above, the tie relationship between the adaptation spec and the learning class index may be individually defined, and should be agreed in advance so that the transmitting and receiving end can recognize them in common.

Although the CQI/TBS table of 3GPP LTE/LTE-A/NR is described above, it is obvious that adaptation spec such as the CQI/TBS table determined in a communication system (e.g., B5G, 6G, B6G, etc.) to which a deep learning-based AI algorithm is applied is defined, and tied to learning classes.

In the above, the tie relationship between the adaptation spec and the learning class index is defined as one standard mode, so that the entire standard spec may be adaptively operated by the learning class. For example, the standard mode is changed according to the learning class change, and the class of adaptation spec or the operation spec itself may be changed for each standard mode, and may be expressed as follows.

4. Control Signaling for Learning Class

When online learning is applied to a communication system to which a deep learning-based AI algorithm is applied, a method for indicating a learning class index is proposed.

4.1. Learning Class Signaling

When online learning is applied to a communication system to which a deep learning-based AI algorithm is applied, the learning class index may be transmitted through the reserved area of the existing control channel. When it is assumed that N learning classes are predefined and promised, a control field corresponding to ceil(log 2(N)) bit(s) may be promised. The learning class field may be predefined in some space of a control channel or data channel (e.g., PBCH, SIB of PDSCH, PDCCH). For example, if there is a bit(s) area reserved for a specific channel, a learning class field may be defined or used in the corresponding area.

When online learning is applied to a communication system to which a deep learning-based AI algorithm is applied, the learning class index may be transmitted through the definition of a new control channel. For example, an AI dedicated channel (e.g., a physical downlink AI channel, PDAICH or a physical uplink AI channel, PUAICH) may be defined (periodically or aperiodically) in some area of a physical resource. Learning class fields may be defined or used based on corresponding channel. Also, when online learning is used based on the corresponding channel, weight update information may be exchanged between transmitting and receiving ends.

4.2. Learning Class Indication Level(s)

If the communication system to which the deep learning-based AI algorithm is applied supports UE-specific adaptation, the learning class index (or standard mode index or adaptation spec index) may be indicated through the UE-specific control channel (e.g., PDCCH, PUCCH). If learning class index (or standard mode index or adaptation spec index) information is transmitted as higher layer information, it may be indicated through a UE-specific data channel (e.g., PDSCH, PUSCH). For example, in a structure capable of online learning for each receiver, such as an AI MIMO detector, a learning class index for each receiver may be updated and fed back.

Figure 24:
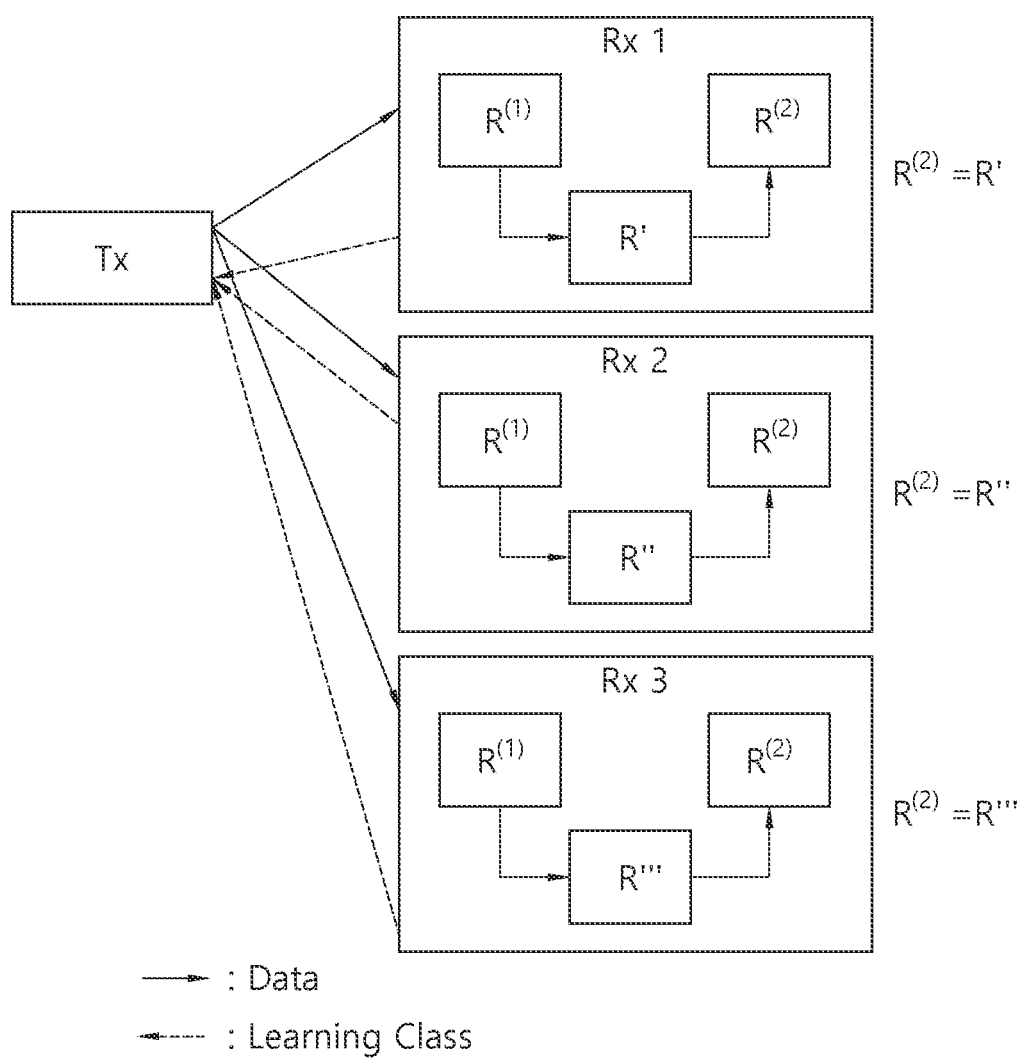
FIG. 24 schematically illustrates an example in which a learning class index for each receiver is updated and fed back.

FIG. 24 schematically illustrates an example in which a learning class index for each receiver is updated and fed back.

In the above, $R^{\wedge}((n))$ refers to the activated NN structure corresponding to the nth learning class, and $R^{\wedge \prime}$ or $R^{\wedge \prime\prime}$, $R^{\wedge \prime\prime\prime}$ refers to the structure of the training NN in the training step. Accordingly, each receiver may individually update the activated NN and individually feedback the achieved learning class. As the activated NN is updated through the above operation, the learning class may be updated and indicated according to the long-term performance evaluation result through the procedure of 2.2.

If a system in which a communication system with a deep learning-based AI algorithm supports cell-specific adaptation, the learning class index (or standard mode index or adaptation spec index) may be indicated through a cell-specific channel (e.g., PBCH, common control channel (PDCCH)). In the above, if learning class index (or standard mode index or adaptation spec index) information is transmitted as higher layer information, it may be indicated through a cell-specific data channel (e.g., SIB through PDSCH). For example, in a structure in which online learning is commonly performed by transmitters and receivers, such as AE, it may be necessary to collect and update training results for each receiver. In this case, through a federated learning method as described below, the transmitter may expect a result trained in multiple receivers, then perform a common AE update.

Figure 25:
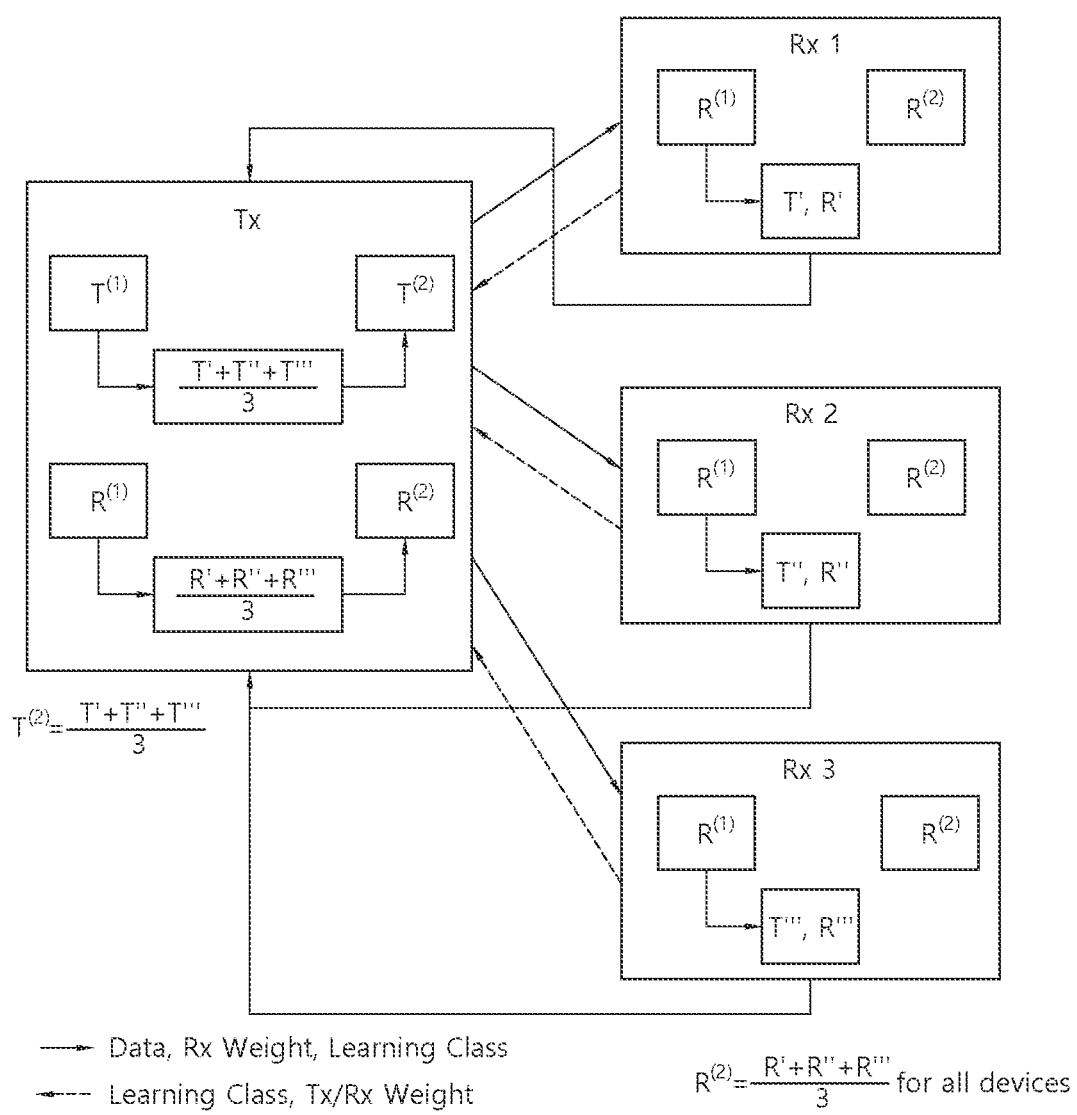
FIG. 25 schematically illustrates an example of performing a common AE update.

FIG. 25 schematically illustrates an example of performing a common AE update.

In the above, $T^{\wedge}((n))$ and $R^{\wedge}((n))$ refer to the Tx AE and Rx AE of the activated NN structure corresponding to the nth learning class, and $T^{\wedge \prime}$, $R^{\wedge \prime}$ or $T^{\wedge \prime\prime}$, $R^{\wedge \prime\prime}$, $T^{\wedge \prime\prime\prime}$, $R^{\wedge \prime\prime\prime}$ refers to the Tx AE and Rx AE of the structure of the training NN in the training step. Accordingly, each receiver feeds back training weights for Tx AEs and Rx AEs, and the transmitter updates the activated NN structure based on the training weights for Tx AEs and Rx AEs from multiple receivers. Then, the transmitter transfers weight information about the Rx AE of the activated NN to multiple receivers. As the activated NN is updated through the above operation, the learning class may be updated and indicated according to the long-term performance evaluation result through the procedure of 2.2.

If a system in which a communication system to which a deep learning-based AI algorithm is applied supports system-specific adaptation, the learning class index (or standard mode index or adaptation spec index) may be indicated through backhaul channel by a central coordinator that manages transmitters (e.g., base stations). Information trained in each transmitter through online learning or training information fed back from receivers in each transmitter is collected by the central coordinator to update the activated NN structure of the entire system, and the central coordinator may forward the updated activated NN structure to each transmitter. For example, it may be expressed as the following structure.

Figure 26:
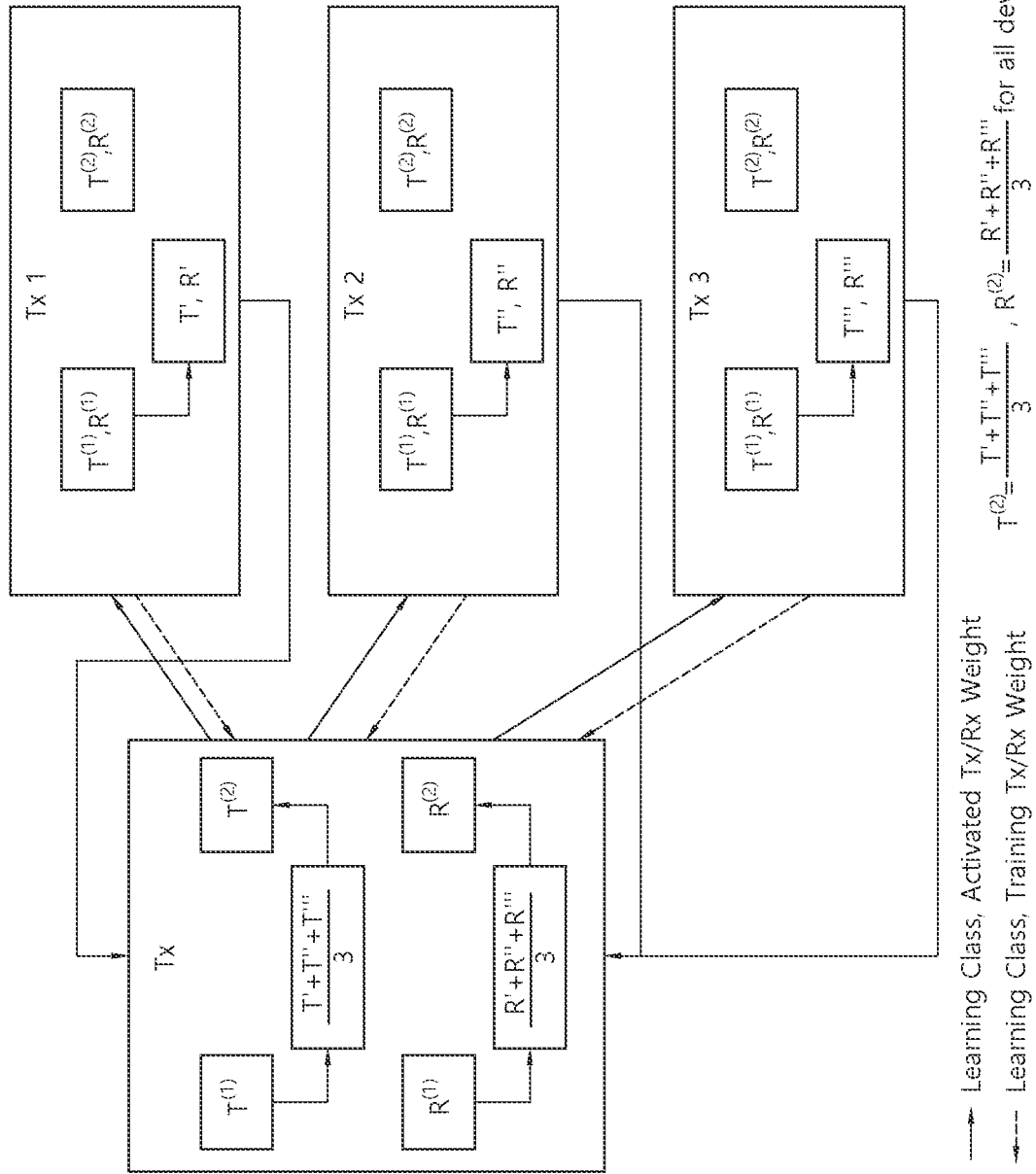
FIG. 26 schematically illustrates an example in which a learning class index is indicated by a central coordinator managing transmitters through a backhaul channel.

FIG. 26 schematically illustrates an example in which a learning class index is indicated by a central coordinator managing transmitters through a backhaul channel.

Meanwhile, according to the configuration of the present disclosure, when the online learning operation of the AI MIMO detector (or auto-encoder) is allowed in 6G, a standard operation definition capable of supporting performance improvement by learning may be provided. In addition, a method of indicating a spec definition and the spec change in a form that allows spec change according to performance change by online learning may be provided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Hereinafter, for a better understanding of the examples of the present disclosure, the disclosure will be described with reference to the drawings. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 27:
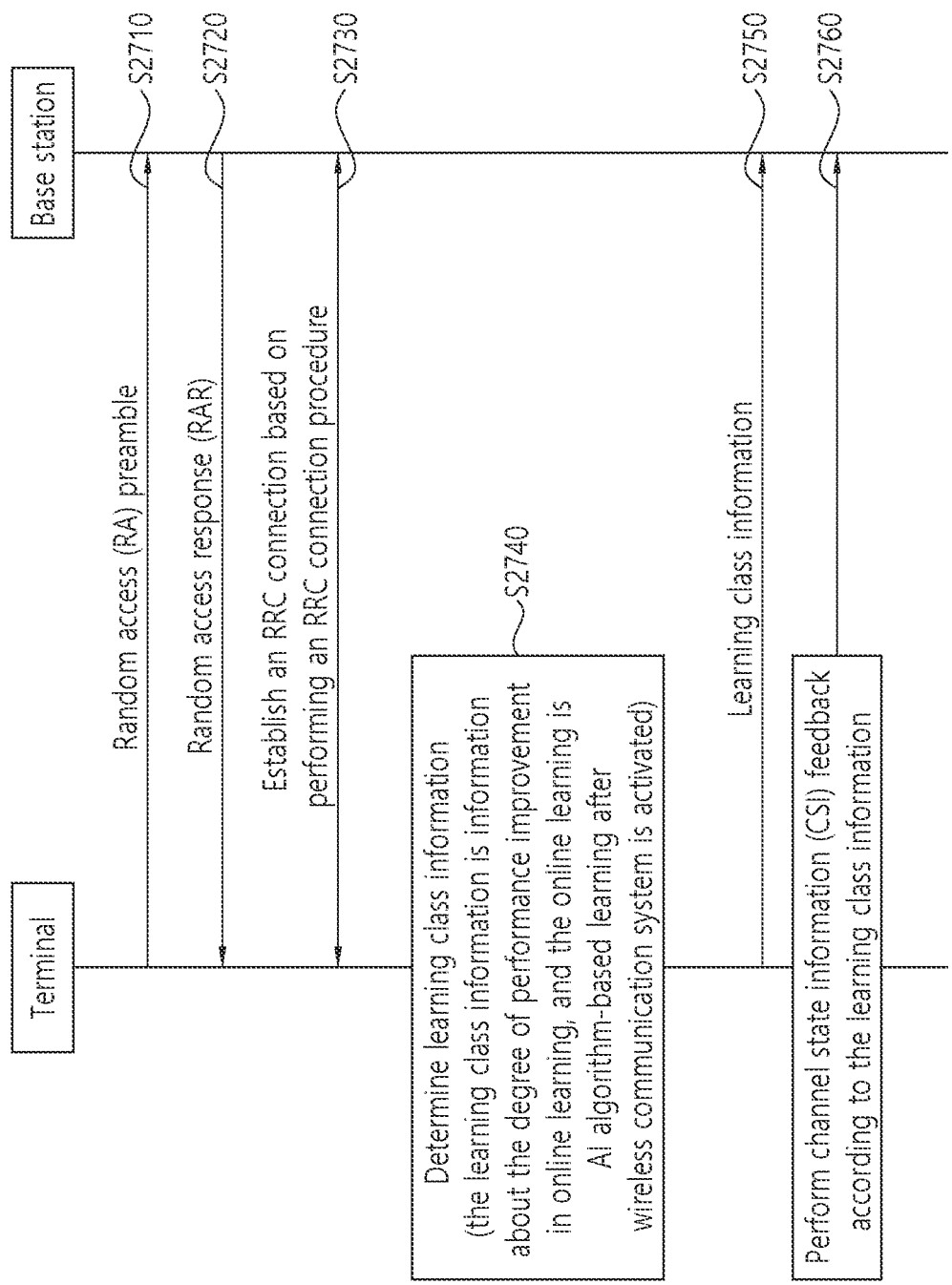
FIG. 27 is a flowchart of a method for transmitting learning class information according to another embodiment of the present disclosure.

FIG. 27 is a flowchart of a method for transmitting learning class information according to another embodiment of the present disclosure.

According to FIG. 27, the terminal may transmit a random access (RA) preamble to the base station (S2710). As more specific details thereof are described above and/or hereinafter, repetitive descriptions will be omitted for ease of explanation.

The terminal may receive a random access response (RAR) from the base station in response to the RA preamble (S2720). As more specific details thereof are described above and/or hereinafter, repetitive descriptions will be omitted for ease of explanation.

The terminal may perform a radio resource control (RRC) connection procedure with the base station (S2730). As more specific details thereof are described above and/or hereinafter, repetitive descriptions will be omitted for ease of explanation.

The terminal may determine the learning class information (S2740). Here, the learning class information is information about the degree of performance improvement in online learning, and the online learning may be artificial intelligence (AI) algorithm-based learning after the wireless communication system is activated. As more specific details thereof are described above and/or hereinafter, repetitive descriptions will be omitted for ease of explanation.

The terminal may transmit the learning class information to the base station (S2750). As more specific details thereof are described above and/or hereinafter, repetitive descriptions will be omitted for ease of explanation.

The terminal may perform channel state information (CSI) feedback according to the learning class information (S2760). As more specific details thereof are described above and/or hereinafter, repetitive descriptions will be omitted for ease of explanation.

Hereinafter, embodiments of the present disclosure will be repeatedly described from the perspective of the subject of the various operations.

Figure 28:
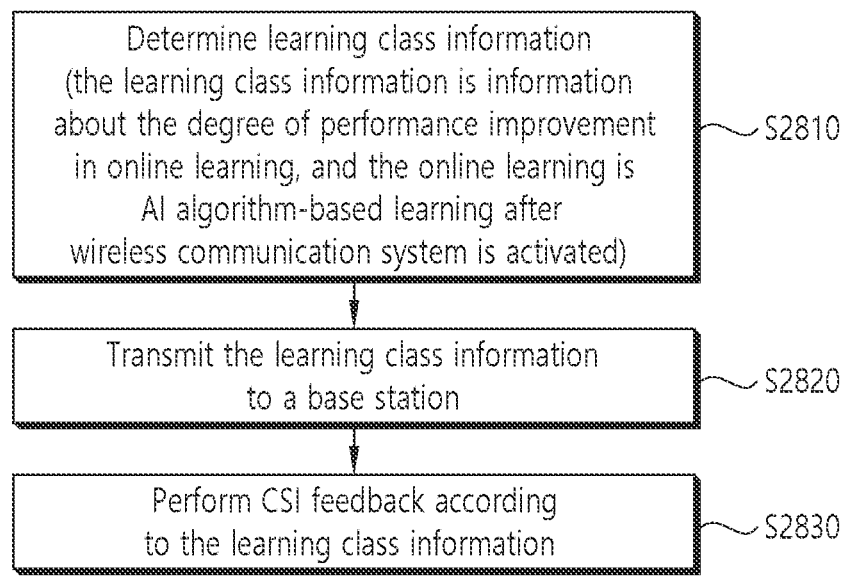
FIG. 28 is a flowchart of a method for transmitting learning class information from a terminal point of view according to an embodiment of the present disclosure.

FIG. 28 is a flowchart of a method for transmitting learning class information from a terminal point of view according to an embodiment of the present disclosure.

According to FIG. 28, the terminal may determine the learning class information (S2810). Here, the learning class information is information about the degree of performance improvement in online learning, and the online learning may be artificial intelligence (AI) algorithm-based learning after the wireless communication system is activated. As more specific details thereof are described above and/or hereinafter, repetitive descriptions will be omitted for ease of explanation.

The terminal may transmit the learning class information to the base station (S2820). As more specific details thereof are described above and/or hereinafter, repetitive descriptions will be omitted for ease of explanation.

The terminal may perform channel state information (CSI) feedback according to the learning class information (S2830). As more specific details thereof are described above and/or hereinafter, repetitive descriptions will be omitted for ease of explanation.

Figure 29:
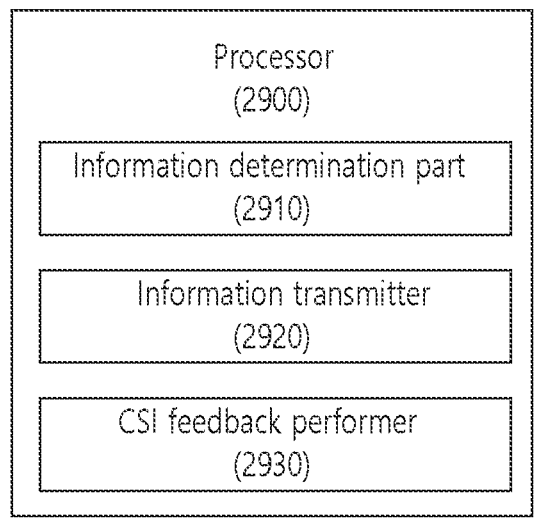
FIG. 29 is a block diagram of an example of a device for transmitting learning class information from a terminal point of view according to an embodiment of the present disclosure.

FIG. 29 is a block diagram of an example of a device for transmitting learning class information from a terminal point of view according to an embodiment of the present disclosure.

According to FIG. 29, a processor 2900 may include an information determination part 2910, an information transmitter 2920, and a CSI feedback performer 2930. The processor herein may correspond to, for example, the processors in FIGS. 32 to 42.

The information determination part 2910 may be configured to determine learning class information. Here, the learning class information is information about the degree of performance improvement in online learning, and the online learning may be artificial intelligence (AI) algorithm-based learning after the wireless communication system is activated. As more specific details thereof are described above and/or hereinafter, repetitive descriptions will be omitted for ease of explanation.

The information transmitter 2920 may be configured to control the transceiver to transmit the learning class information to the base station. As more specific details thereof are described above and/or hereinafter, repetitive descriptions will be omitted for ease of explanation.

The CSI feedback performer 2930 may be configured to perform channel state information (CSI) feedback according to the learning class information. As more specific details thereof are described above and/or hereinafter, repetitive descriptions will be omitted for ease of explanation.

Although not separately shown, according to an embodiment of the present disclosure, a terminal includes a transceiver, at least one memory, and at least one processor operably coupled to the at least one memory and the transceiver, and may be a terminal characterized in that the processor is configured to: control the transceiver to transmit a random access (RA) preamble to a base station, control the transceiver to receive a random access response (RAR) from the base station in response to the RA preamble, perform a radio resource control (RRC) connection procedure with the base station, and determine learning class information, wherein the learning class information is information about the degree of performance improvement in online learning, and the online learning may be artificial intelligence (AI) algorithm-based learning after the wireless communication system is activated, control the transceiver to transmit the learning class information to the base station, and perform channel state information (CSI) feedback according to the learning class information.

According to another embodiment of the present disclosure, a device includes at least one memory and at least one processor operably coupled to the at least one memory, and may be a device characterized in that the processor is configured to: control a transceiver to transmit a random access (RA) preamble to a base station, control the transceiver to receive a random access response (RAR) from the base station in response to the RA preamble, perform a radio resource control (RRC) connection procedure with the base station, and determine learning class information, wherein the learning class information is information about the degree of performance improvement in online learning, and the online learning may be artificial intelligence (AI) algorithm-based learning after the wireless communication system is activated, control the transceiver to transmit the learning class information to the base station, and perform channel state information (CSI) feedback according to the learning class information.

According to another embodiment of the present disclosure, at least one computer readable medium comprising instructions, based on being executed by at least one processor, may be configured to control a transceiver to transmit a random access (RA) preamble to a base station, control the transceiver to receive a random access response (RAR) from the base station in response to the RA preamble, perform a radio resource control (RRC) connection procedure with the base station, and determine learning class information, wherein the learning class information is information about the degree of performance improvement in online learning, and the online learning may be artificial intelligence (AI) algorithm-based learning after the wireless communication system is activated, control the transceiver to transmit the learning class information to the base station, and perform channel state information (CSI) feedback according to the learning class information.

Figure 30:
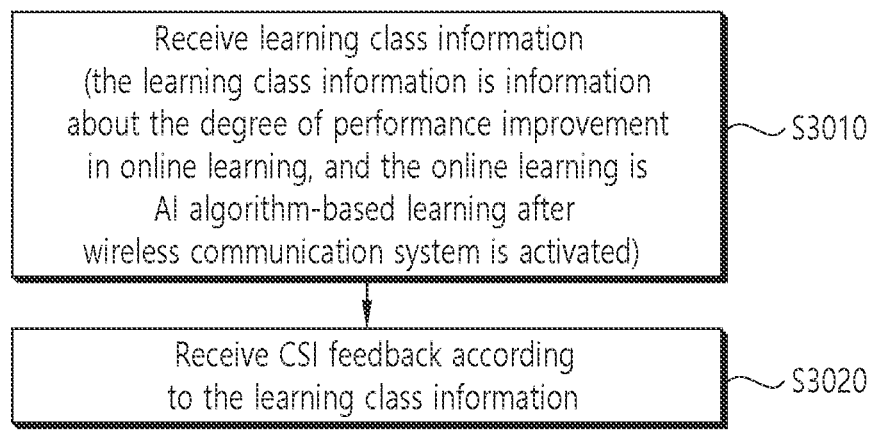
FIG. 30 is a flowchart of a method for receiving learning class information from a base station point of view according to an embodiment of the present disclosure.

FIG. 30 is a flowchart of a method for receiving learning class information from a base station point of view according to an embodiment of the present disclosure.

According to FIG. 30, the base station may receive the learning class information from the terminal (S3010). Here, the learning class information is information about the degree of performance improvement in online learning, and the online learning may be artificial intelligence (AI) algorithm-based learning after the wireless communication system is activated. As more specific details thereof are described above and/or hereinafter, repetitive descriptions will be omitted for ease of explanation.

The base station may receive channel state information (CSI) feedback according to the learning class information (S3020). As more specific details thereof are described above and/or hereinafter, repetitive descriptions will be omitted for ease of explanation.

Figure 31:
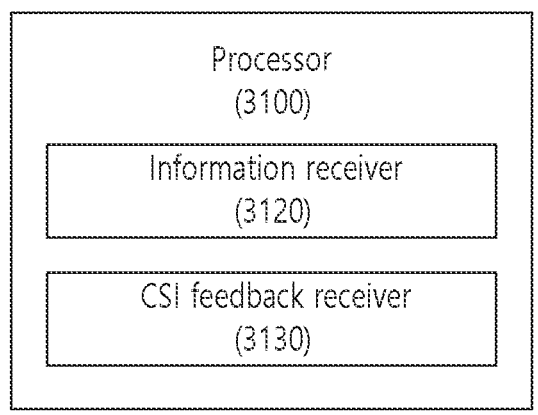
FIG. 31 is a block diagram of an example of a device for receiving learning class information from a base station point of view according to an embodiment of the present disclosure.

FIG. 31 is a block diagram of an example of a device for receiving learning class information from a base station point of view according to an embodiment of the present disclosure.

According to FIG. 31, a processor 3100 may include an information receiver 3110 and a CSI feedback receiver 3120.

The processor herein may correspond to, for example, the processors in FIGS. 32 to 42.

The information receiving unit 3110 may be configured to control a transceiver to receive the learning class information from a terminal. Here, the learning class information is information about the degree of performance improvement in online learning, and the online learning may be artificial intelligence (AI) algorithm-based learning after the wireless communication system is activated. As more specific details thereof are described above and/or hereinafter, repetitive descriptions will be omitted for ease of explanation.

The CSI feedback receiver 3120 may be configured to control the transceiver to receive channel state information (CSI) feedback according to the learning class information. As more specific details thereof are described above and/or hereinafter, repetitive descriptions will be omitted for ease of explanation.

Figure 32:
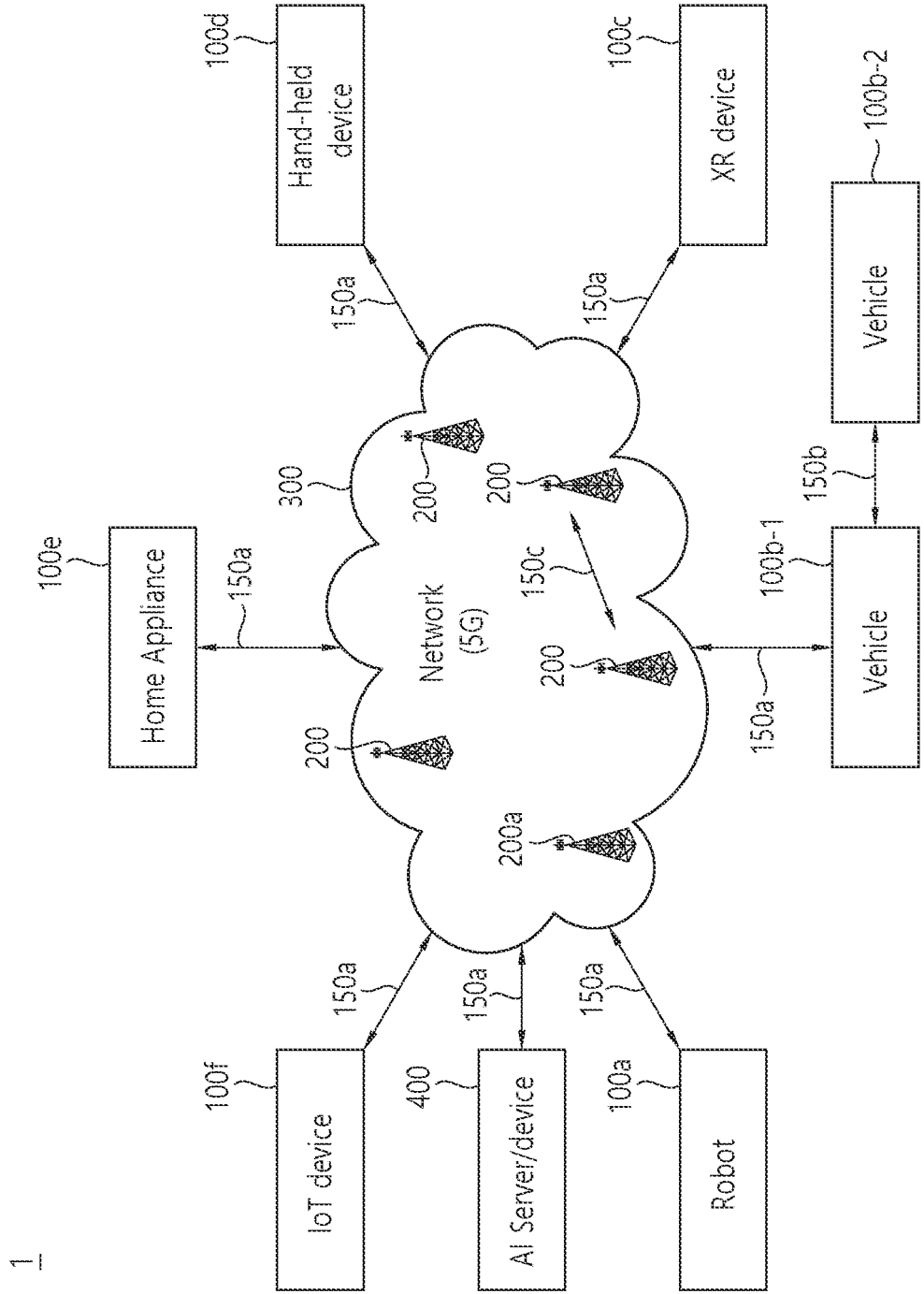
FIG. 32 illustrates a communication system 1 applied to the present disclosure.

FIG. 32 illustrates a communication system 1 applied to the present disclosure.

Referring to FIG. 32, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1, 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

The wireless devices 100a~100f may be connected to the network 300 via the BSs 200. An AI technology may be applied to the wireless devices 100a~100f and the wireless devices 100a~100f may be connected to the AI server 400 via the network 300. The network 300 may be configured using a 3G network, a 4G (e.g., LTE) network, or a 5G (e.g., NR) network. Although the wireless devices 100a~100f may communicate with each other through the BSs 200/network 300, the wireless devices 100a~100f may perform direct communication (e.g., sidelink communication) with each other without passing through the BSs/network. For example, the vehicles 100b-1, 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a~100f.

Wireless communication/connections 150a, 150b, 150c may be established between the wireless devices 100a~100f/ BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a, 150b. For example, the wireless communication/connections 150a, 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 10 below. For convenience of explanation, among the frequency ranges used in the NR system, FR1 may mean "sub 6 GHz range" and FR2 may mean "above 6 GHz range" and may be called millimeter wave (mmW).

TABLE 10

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 11 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band. The unlicensed band may be used for various purposes, and may be used, for example, for vehicle communication (e.g., autonomous driving).

TABLE 11

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of a wireless device to which the present disclosure is applied will be described.

Figure 33:
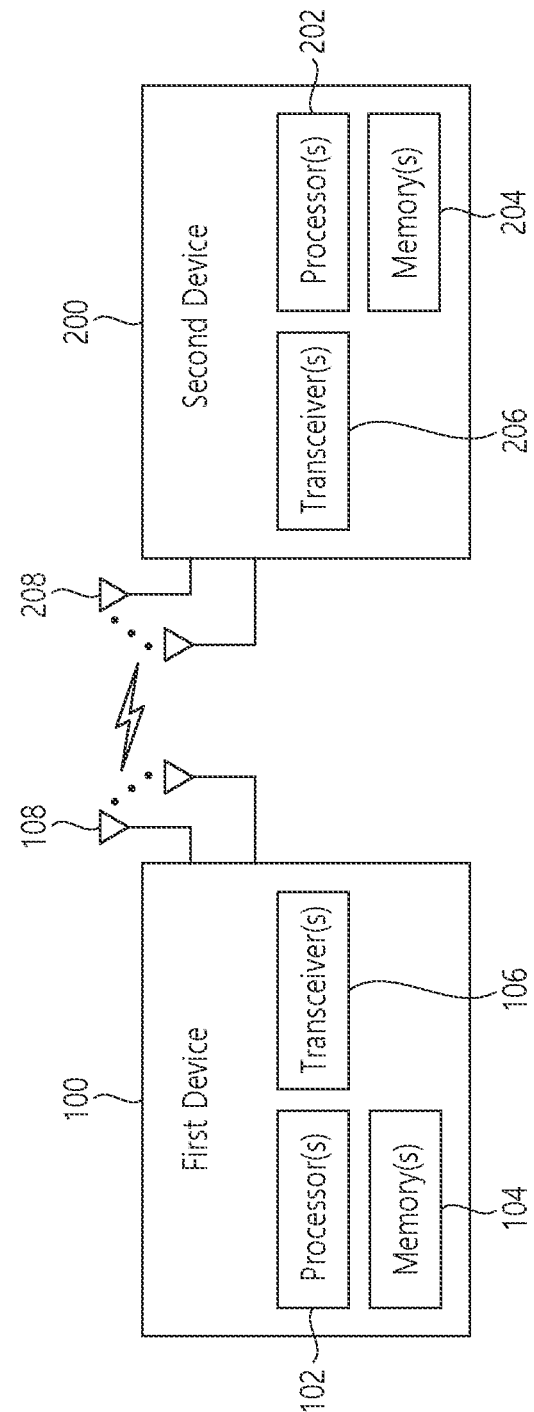
FIG. 33 illustrates an example of a wireless device that may be applicable to the present disclosure.

FIG. 33 illustrates an example of a wireless device that may be applicable to the present disclosure.

Referring to FIG. 33, a first wireless device 100 and a second wireless device 200 may transmit radio signals through a variety of RATs (e.g., LTE and NR). Herein, {the first wireless device 100 and the second wireless device 200} may correspond to {the wireless device 100x, the BS 200} and/or {the wireless device 100x, the wireless device 100x} of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100, 200 will be described more specifically. One or more protocol layers may be implemented by, without being limited to, one or more processors 102, 202. For example, the one or more processors 102, 202 may implement one or more layers (e.g., functional layers such as PHY, MAC, RLC, PDCP, RRC, and SDAP). The one or more processors 102, 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102, 202 may generate messages, control information, data, or information according to the descriptions, functions, procedures, proposals, methods, and/or operational flowcharts disclosed in this document. The one or more processors 102, 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106, 206. The one or more processors 102, 202 may receive the signals (e.g., baseband signals) from the one or more transceivers 106, 206 and obtain the PDUs, SDUs, messages, control information, data, or information according to the descriptions, functions, procedures, proposals, methods, and/or operational flowcharts disclosed in this document.

The one or more processors 102, 202 may be referred to as controllers, microcontrollers, microprocessors, or microcomputers. The one or more processors 102, 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102, 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102, 202 or stored in the one or more memories 104, 204 so as to be driven by the one or more processors 102, 202. The descriptions, functions, procedures, proposals, methods, and/or operational flowcharts disclosed in this document may be implemented using firmware or software in the form of code, commands, and/or a set of commands.

The one or more memories 104, 204 may be connected to the one or more processors 102, 202 and store various types of data, signals, messages, information, programs, code, instructions, and/or commands. The one or more memories 104, 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104, 204 may be located at the interior and/or exterior of the one or more processors 102, 202. The one or more memories 104, 204 may be connected to the one or more processors 102, 202 through various technologies such as wired or wireless connection.

The one or more transceivers 106, 206 may transmit user data, control information, and/or radio signals/channels, mentioned in the methods and/or operational flowcharts of this document, to one or more other devices. The one or more transceivers 106, 206 may receive user data, control information, and/or radio signals/channels, mentioned in the descriptions, functions, procedures, proposals, methods, and/or operational flowcharts disclosed in this document, from one or more other devices. For example, the one or more transceivers 106, 206 may be connected to the one or more processors 102, 202 and transmit and receive radio signals. For example, the one or more processors 102, 202 may perform control so that the one or more transceivers 106, 206 may transmit user data, control information, or radio signals to one or more other devices. The one or more processors 102, 202 may perform control so that the one or more transceivers 106, 206 may receive user data, control information, or radio signals from one or more other devices. The one or more transceivers 106, 206 may be connected to the one or more antennas 108, 208 and the one or more transceivers 106, 206 may be configured to transmit and receive user data, control information, and/or radio signals/channels, mentioned in the descriptions, functions, procedures, proposals, methods, and/or operational flowcharts disclosed in this document, through the one or more antennas 108, 208. In this document, the one or more antennas may be a plurality of physical antennas or a plurality of logical antennas (e.g., antenna ports). The one or more transceivers 106, 206 may convert received radio signals/channels, and so on, from RF band signals into baseband signals in order to process received user data, control information, radio signals/channels, and so on, using the one or more processors 102, 202. The one or more transceivers 106, 206 may convert the user data, control information, radio signals/channels, and so on, processed using the one or more processors 102, 202 from the base band signals into the RF band signals. To this end, the one or more transceivers 106, 206 may include (analog) oscillators and/or filters.

Figure 34:
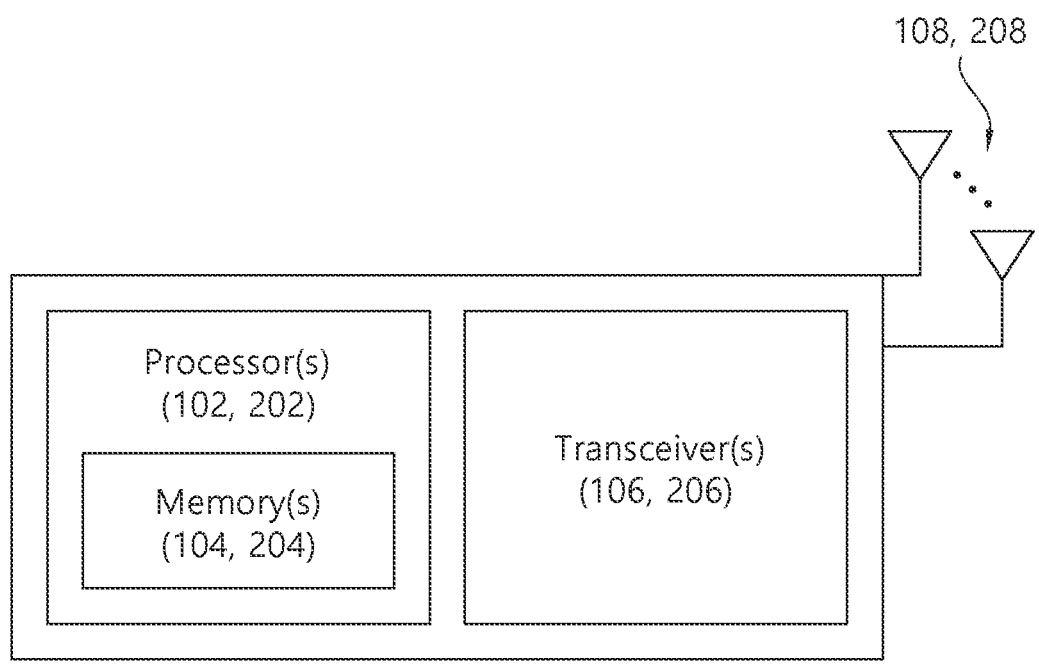
FIG. 34 illustrates another example of a wireless device that may be applicable to the present disclosure.

FIG. 34 illustrates another example of a wireless device that may be applicable to the present disclosure.

According to FIG. 34, a wireless device may include at least one processor 102, 202, at least one memory 104, 204, at least one transceiver 106, 206, and one or more antennas 108, 208.

As a difference between the example of the wireless device described above in FIG. 33 and the example of the wireless device in FIG. 34, in FIG. 33, the processors 102 and 202 and the memories 104 and 204 are separated, but in the example of FIG. 34, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present disclosure is applied will be described.

Figure 35:
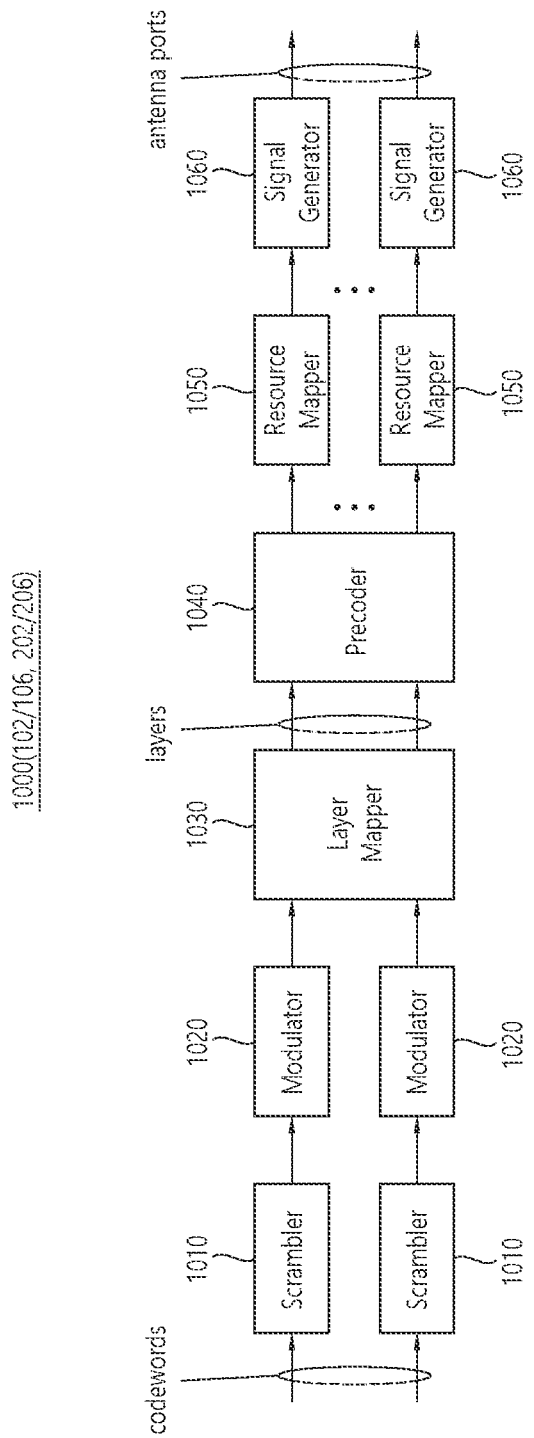
FIG. 35 illustrates an example of a signal processing circuit for a transmission signal.

FIG. 35 illustrates an example of a signal processing circuit for a transmission signal.

Referring to FIG. 35, a signal processing circuit 1000 may include scramblers 1010, modulators 1020, a layer mapper 1030, a precoder 1040, resource mappers 1050, and signal generators 1060. An operation/function of FIG. 35 may be performed, without being limited to, the processors 102, 202 and/or the transceivers 106, 206 of FIG. 33. Hardware elements of FIG. 35 may be implemented by the processors 102, 202 and/or the transceivers 106, 206 of FIG. 33. For example, blocks 1010~1060 may be implemented by the processors 102, 202 of FIG. 33. Alternatively, the blocks 1010~1050 may be implemented by the processors 102, 202 of FIG. 33 and the block 1060 may be implemented by the transceivers 106, 206 of FIG. 33.

Codewords may be converted into radio signals via the signal processing circuit 1000 of FIG. 35. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010~1060 of FIG. 35. For example, the wireless devices (e.g., 100, 200 of FIG. 33) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present disclosure is applied will be described.

Figure 36:
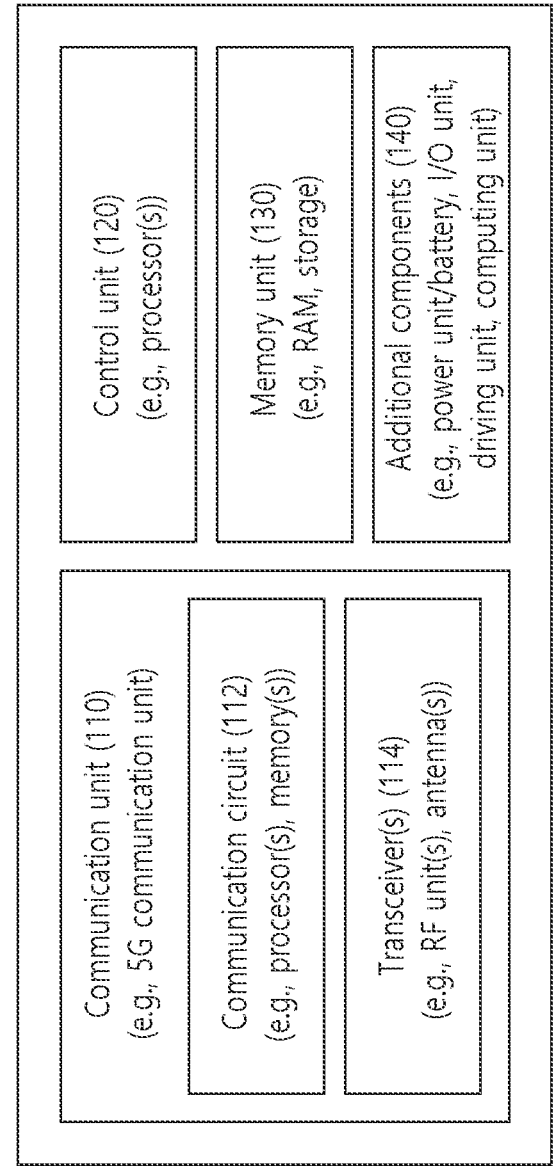
FIG. 36 illustrates another example of a wireless device applied to the present disclosure.

FIG. 36 illustrates another example of a wireless device applied to the present disclosure. The wireless device may be implemented in various forms according to a use-case/service (refer to FIG. 32).

Referring to FIG. 36, wireless devices 100, 200 may correspond to the wireless devices 100, 200 of FIG. 33 and may be configured by various elements, components, units/portions, and/or modules. For example, each of the wireless devices 100, 200 may include a communication unit 110, a control unit 120, a memory unit 130, and additional components 140. The communication unit may include a communication circuit 112 and transceiver(s) 114. For example, the communication circuit 112 may include the one or more processors 102, 202 and/or the one or more memories 104, 204 of FIG. 33. For example, the transceiver(s) 114 may include the one or more transceivers 106, 206 and/or the one or more antennas 108, 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 32), the vehicles (100*b*-1, 100*b*-2 of FIG. 32), the XR device (100*c* of FIG. 32), the hand-held device (100*d* of FIG. 32), the home appliance (100*e* of FIG. 32), the IoT device (100*f* of FIG. 32), a digital broadcast terminal, a hologram device, a public safety device, an MTC device, a medicine device, a fintech device (or a finance device), a security device, a climate/environment device, the AI server/device (400 of FIG. 32), the BSs (200 of FIG. 32), a network node, and so on. The wireless device may be used in a mobile or fixed place according to a use-example/service.

In FIG. 36, the entirety of the various elements, components, units/portions, and/or modules in the wireless devices 100, 200 may be connected to each other through a wired interface or at least a part thereof may be wirelessly connected through the communication unit 110. For example, in each of the wireless devices 100, 200, the control unit 120 and the communication unit 110 may be connected by wire and the control unit 120 and first units (e.g., 130, 140) may be wirelessly connected through the communication unit 110. Each element, component, unit/portion, and/or module within the wireless devices 100, 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 36 will be described in detail with reference to the drawings.

Figure 37:
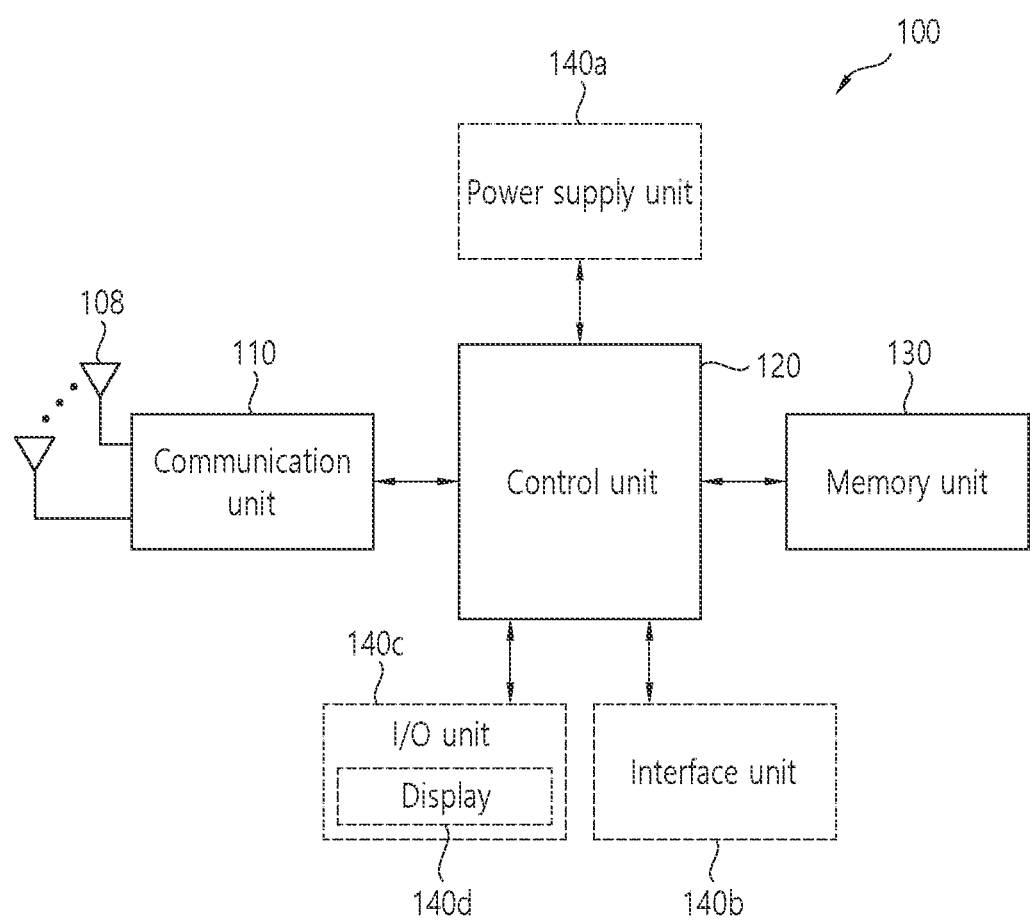
FIG. 37 illustrates an example of a hand-held device applied to the present disclosure.

FIG. 37 illustrates an example of a hand-held device applied to the present disclosure. The hand-held device may include smartphones, smartpads, wearable devices (e.g., smartwatches, smartglasses), and portable computers (e.g., laptops). A hand-held device may be referred to as a Mobile Station (MS), User Terminal (UT), Mobile Subscriber Station (MSS), Subscriber Station (SS), Advanced Mobile Station (AMS), or Wireless Terminal (WT).

Referring to FIG. 37, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110~130/140*a*~140*c* correspond to the blocks 110~130/140 of FIG. 36, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, and so on. The interface unit 140*b* may support connection of the hand-held device 100 to other external devices. The interface unit 140*b* may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 38:
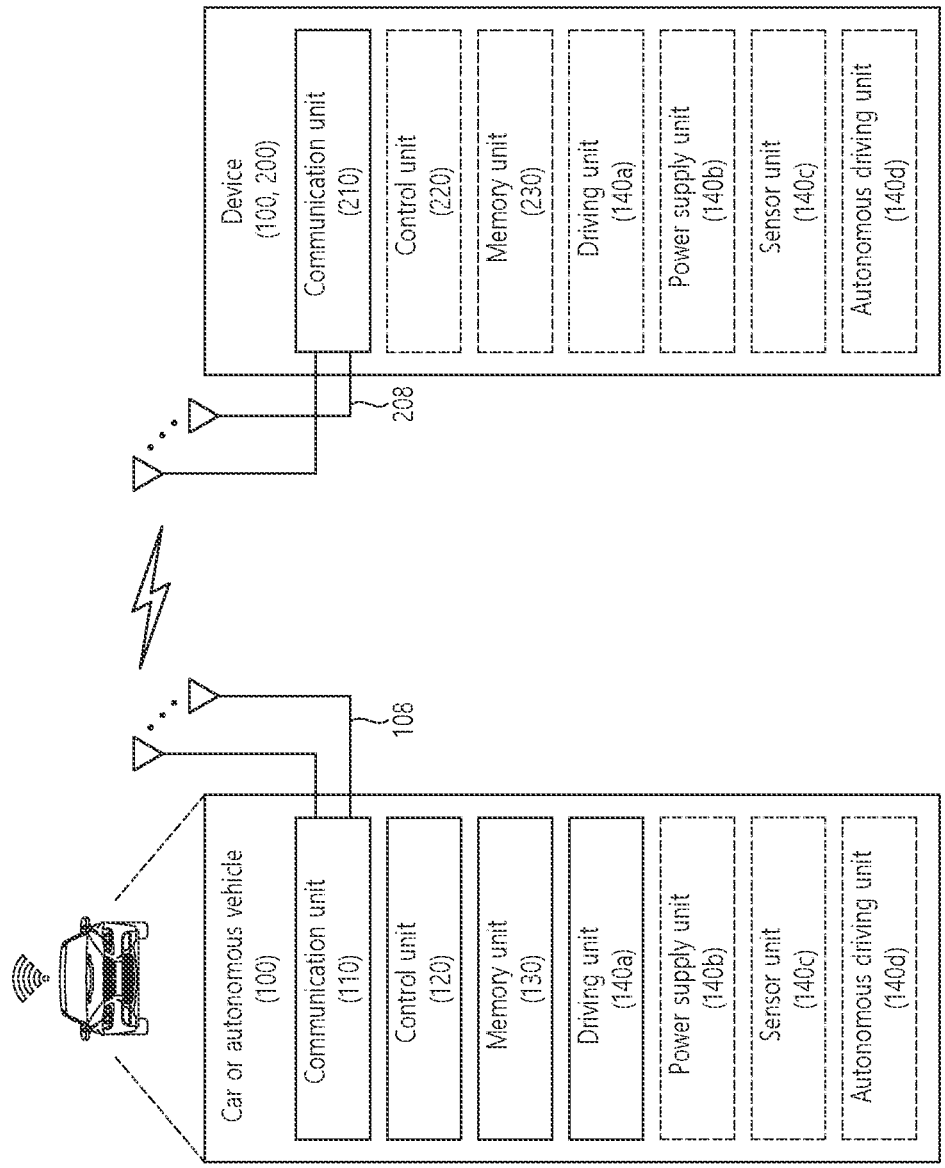
FIG. 38 illustrates an example of a vehicle or autonomous vehicle applied to the present disclosure.

FIG. 38 illustrates an example of a vehicle or autonomous vehicle applied to the present disclosure.

The vehicle or autonomous vehicle may be implemented by a mobile robot, a car, a train, a manned/unmanned Aerial Vehicle (AV), a ship, and so on.

Referring to FIG. 38, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a~140d correspond to the blocks 110/130/140 of FIG. 36, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, and so on. The power supply unit 140b may supply power to the vehicle or the autonomous vehicle 100 and include a wired/wireless charging circuit, a battery, and so on. The sensor unit 140c may obtain a vehicle state, ambient environment information, user information, and so on. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on, from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 39:
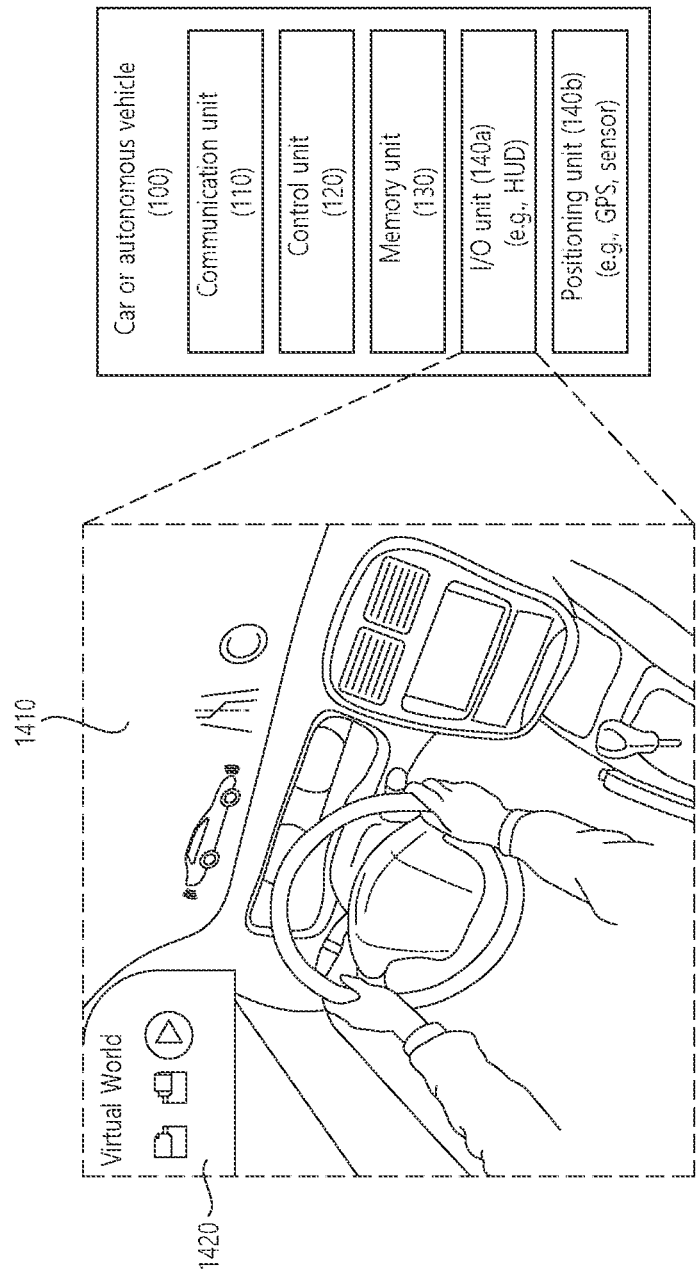
FIG. 39 illustrates an example of a vehicle applied to the present disclosure.

FIG. 39 illustrates an example of a vehicle applied to the present disclosure. The vehicle may be implemented as a transport means, an aerial vehicle, a ship, and so on.

Referring to FIG. 39, a vehicle 100 may include a communication unit 110, a control unit 120, a memory unit 130, an I/O unit 140a, and a positioning unit 140b. Herein, the blocks 110~130/140a~140b correspond to blocks 110~130/140 of FIG. 36.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may obtain information on the position of the vehicle 100. The position information may include information on an absolute position of the vehicle 100, information on the position of the vehicle 100 within a traveling lane, acceleration information, and information on the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle 1410, 1420. The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information on driving/vehicle abnormality to related organizations.

Figure 40:
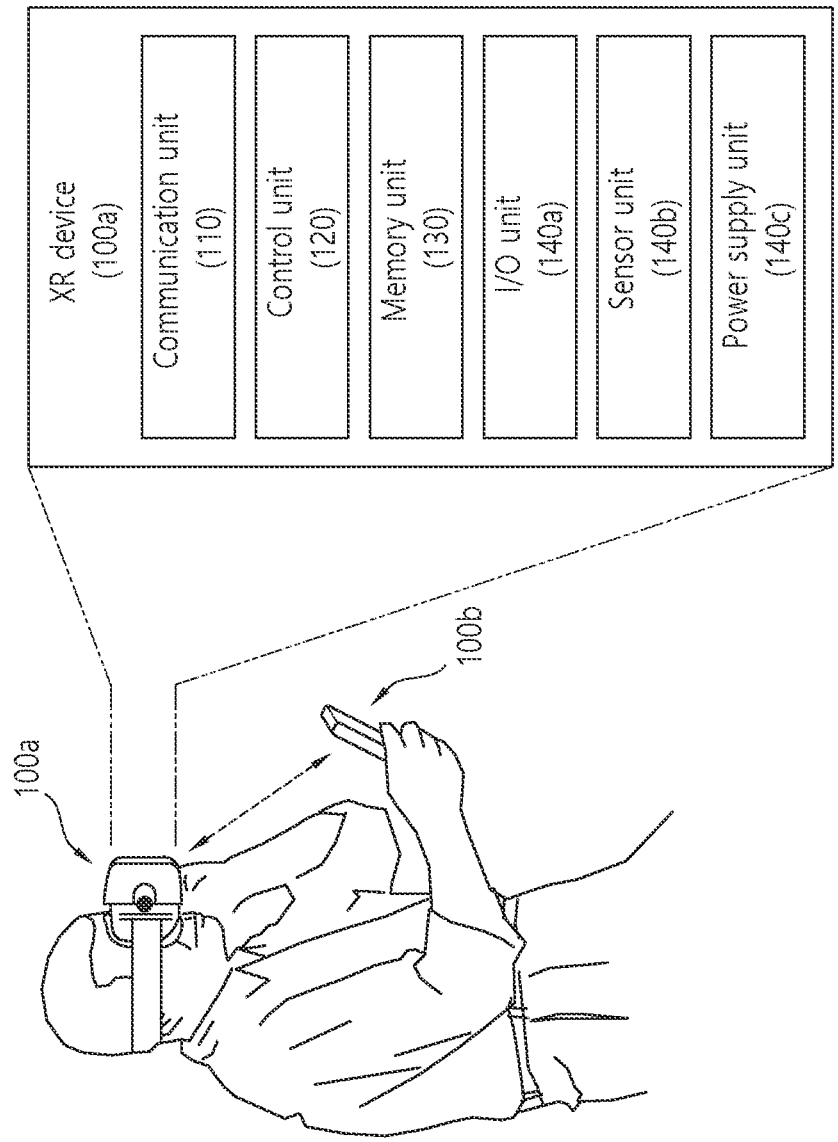
FIG. 40 illustrates an example of an XR device applied to the present disclosure.

FIG. 40 illustrates an example of an XR device applied to the present disclosure. The XR device may be implemented by an HMD, an HUD mounted in a vehicle, a television, a smartphone, a wearable device, a computer, a home appliance, a digital signage, a vehicle, a robot, and so on.

Referring to FIG. 40, an XR device 100*a* may include a communication unit 110, a control unit 120, a memory unit 130, an I/O unit 140*a*, a sensor unit 140*b*, and a power supply unit 140*c*. Herein, the blocks 110~130/140*a*~140*c* correspond to the blocks 110~130/140 of FIG. 36, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, and so on. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, and so on.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information on a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information on a 3D position of the hand-held device 100*b* and generate and output an XR object corresponding to the hand-held device 100*b*.

Figure 41:
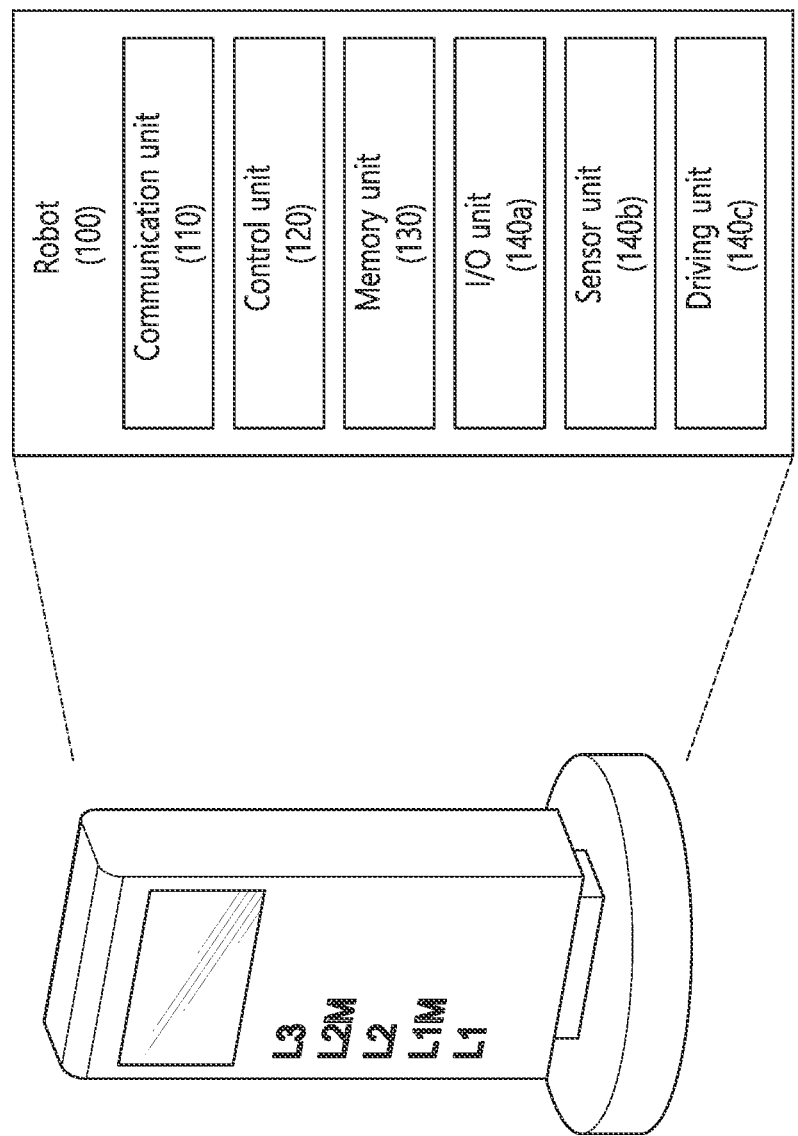
FIG. 41 illustrates an example of a robot applied to the present disclosure.

FIG. 41 illustrates an example of a robot applied to the present disclosure. The robot may be categorized into an industrial robot, a medical robot, a household robot, a military robot, and so on, according to a used purpose or field.

Referring to FIG. 41, a robot 100 may include a communication unit 110, a control unit 120, a memory unit 130, an I/O unit 140*a*, a sensor unit 140*b*, and a driving unit 140*c*. Herein, the blocks 110~130/140*a*~140*c* correspond to the blocks 110~130/140 of FIG. 36, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, and so on. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, and so on.

Figure 42:
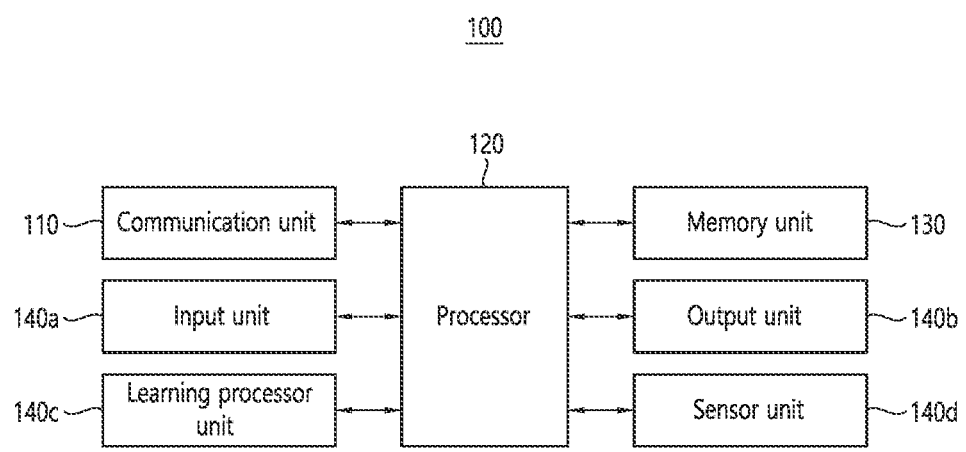
FIG. 42 illustrates an example of an AI device applied to the present disclosure.

FIG. 42 illustrates an example of an AI device applied to the present disclosure.

The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 42, an AI device 100 may include a communication unit 110, a control unit 120, a memory unit 130, an I/O unit 140*a*/140*b*, a learning processor unit 140*c*, and a sensor unit 140*d*. The blocks 110~130/140*a*~140*d* correspond to blocks 110~130/140 of FIG. 36, respectively.

The communication unit 110 may transmit and receive wired/radio signals (e.g., sensor information, user input, learning models, or control signals) to and from external devices such as other AI devices (e.g., 100*x*, 200, 400 of FIG. 32) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 32). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may obtain various types of data from the exterior of the AI device 100. For example, the input unit 140a may obtain learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 32). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transmitting learning class information in a wireless communication system, performed by a terminal, comprising:
   transmitting, to a base station, a random access (RA) preamble;
   receiving, from the base station, a random access response (RAR) in response to the RA preamble;
   performing a radio resource control (RRC) connection procedure with the base station;
   determining the learning class information,
   wherein the learning class information is information about a degree of performance improvement in online learning,
   wherein the online learning is artificial intelligence (AI) algorithm-based learning after the wireless communication system is activated;
   transmitting the learning class information to the base station; and
   performing an operation according to the learning class information.

2. The method of claim 1, wherein the operation comprises at least one of a channel state information (CSI) feedback, an operation related to a modulation and coding scheme (MCS) or an operation related to a reference signal (RS) pattern.

3. The method of claim 2, wherein a plurality of channel quality indicator (CQI) tables is shared between the terminal and the base station.

4. The method of claim 3, wherein the terminal performs the CSI feedback based on a CQI table tied to the learning class information among the plurality of CQI tables.

5. The method of claim 2, wherein, when performing the CSI feedback, the terminal transmits at least one of Channel Quality Information (CQI), a Precoding Matrix Indicator (PMI), a Layer Indicator (LI) and a Rank Indicator (RI) to the base station.

6. The method of claim 5, wherein the terminal performs the CSI feedback differently according to the learning class information.

7. The method of claim 6, wherein, based on the learning class information indicating that the degree of performance improvement is high, the terminal transmits a small amount of information to the base station through the CSI feedback.

8. The method of claim 7, wherein, based on the learning class information indicating that the degree of performance improvement is low, the terminal transmits a large amount of information to the base station through the CSI feedback.

9. The method of claim 8, wherein the learning class information indicates any one of a first class, a second class, a third class, and a fourth class,
   wherein the second class has a higher degree of performance improvement than the first class,
   wherein the third class has a higher degree of performance improvement than the second class, and
   wherein the fourth class has a higher degree of performance improvement than the third class.

10. The method of claim 9, wherein, based on the learning class information indicating the first class, the terminal transmits the CQI, the PMI, the LI and the RI to the base station,
    wherein, based on the learning class information indicating the second class or the third class, the terminal transmits the CQI and the PMI to the base station,
    wherein, based on the learning class information indicating the fourth class, the terminal transmits only the CQI to the base station.

11. The method of claim 9, wherein the terminal determines which one of the first class, the second class, the third class, and the fourth class the learning class information indicates based on predefined measurement criteria.

12. A terminal comprising:
    a transceiver;
    at least one memory; and
    at least one processor operably coupled to the at least one memory and the transceiver, wherein the processor is,
    configured to control the transceiver to transmit, to a base station, a random access (RA) preamble;
    configured to control the transceiver to receive, from the base station, a random access response (RAR) in response to the RA preamble;

configured to perform a radio resource control (RRC) connection procedure with the base station;
configured to determine learning class information,
wherein the learning class information is information about a degree of performance improvement in online learning,
wherein the online learning is artificial intelligence (AI) algorithm-based learning after a wireless communication system is activated;
configured to control the transceiver to transmit the learning class information to the base station; and
configured to perform channel state information (CSI) feedback according to the learning class information.

13. A base station comprising:
a transceiver;
at least one memory; and
at least one processor operably coupled to the at least one memory and the transceiver, wherein the processor is,
configured to control the transceiver to receive a random access (RA) preamble from a terminal;
configured to control the transceiver to transmit a random access response (RAR) to the terminal in response to the RA preamble;
configured to perform a radio resource control (RRC) connection procedure with the terminal; and
configured to control the transceiver to receive learning class information from the terminal,
wherein the learning class information is information about a degree of performance improvement in online learning,
wherein the online learning is artificial intelligence (AI) algorithm-based learning after a wireless communication system is activated.

* * * * *